US00RE51096E

(19) United States
(12) Reissued Patent
Burks et al.

(10) Patent Number: US RE51,096 E
(45) Date of Reissued Patent: Oct. 27, 2026

(54) CONTROLLER NETWORKS FOR AN ACCESSORY MANAGEMENT SYSTEM

(71) Applicant: Apple Inc., Cupertino, CA (US)

(72) Inventors: Andrew Burks, Mountain View, CA (US); Anush G. Nadathur, Campbell, CA (US); Srinivas Rama, Cupertino, CA (US); Kevin P. McLaughlin, Waikoloa, HI (US); Joe Abuan, Cupertino, CA (US); Dennis Mathews, Pleasanton, CA (US); Matthew C. Lucas, San Jose, CA (US)

(73) Assignee: Apple Inc., Cupertino, CA (US)

(21) Appl. No.: 17/144,074

(22) Filed: Jan. 7, 2021

Related U.S. Patent Documents

Reissue of:
(64) Patent No.: 10,177,933
Issued: Jan. 8, 2019
Appl. No.: 14/725,891
Filed: May 29, 2015

U.S. Applications:
(60) Provisional application No. 62/005,764, filed on May 30, 2014, provisional application No. 62/094,391, filed on Dec. 19, 2014.

(51) Int. Cl.
*H04B 7/00* (2006.01)
*G08C 17/02* (2006.01)
(Continued)

(52) U.S. Cl.
CPC ..... *H04L 12/282* (2013.01); *G08C 17/02* (2013.01); *H04L 63/0281* (2013.01);
(Continued)

(58) Field of Classification Search
CPC ..... H04B 12/282
See application file for complete search history.

(56) References Cited

U.S. PATENT DOCUMENTS 5,059,871 A 10/1991 Pearlman et al.
5,086,385 A 2/1992 Launey
(Continued)

FOREIGN PATENT DOCUMENTS

AU 2015214079 9/2016
CN 1516023 7/2004
(Continued)

OTHER PUBLICATIONS

US 12,184,526 B2, 12/2024, Abuan et al. (withdrawn)
(Continued)

*Primary Examiner* — Angela M Lie
(74) *Attorney, Agent, or Firm* — BAKERHOSTETLER; Kyle B. Morse

(57) ABSTRACT

Controllers can be used to control the operation of various accessories. Controllers with access to a particular accessory (or group of accessories) can be organized into a controller network to facilitate control. The controller network can include various proxy devices including bridge and tunnel proxies that can relay messages to and from accessories, perform protocol translations, and/or provide communication security. Some proxy devices can include decision logic to enable coordinated control over one or more accessories by the controllers in the controller network.

30 Claims, 13 Drawing Sheets

(51) Int. Cl.

| | |
|---|---|
| ***H04L 9/40*** | (2022.01) |
| ***H04L 12/28*** | (2006.01) |
| ***H04L 29/06*** | (2006.01) |

(52) U.S. Cl.

CPC ..... *H04L 63/102* (2013.01); *G08C 2201/20* (2013.01); *G08C 2201/40* (2013.01); *G08C 2201/60* (2013.01); *G08C 2201/91* (2013.01); *G08C 2201/93* (2013.01)

(56) References Cited

U.S. PATENT DOCUMENTS 5,471,190 A 11/1995 Zimmermann
5,621,662 A 4/1997 Humphries et al.
5,907,279 A * 5/1999 Bruins ..... G08B 25/003 340/12.23
6,150,921 A 11/2000 Werb et al.
6,249,680 B1 6/2001 Wax et al.
6,615,088 B1 9/2003 Myer et al.
6,618,630 B1 9/2003 Jundt et al.
6,631,271 B1 10/2003 Logan
6,739,145 B2 5/2004 Bhatnagar
6,756,998 B1 6/2004 Bilger
6,834,208 B2 12/2004 Gonzales et al.
6,912,429 B1 6/2005 Bilger
6,980,080 B2 12/2005 Christensen et al.
6,996,402 B2 2/2006 Logan et al.
7,047,092 B2 5/2006 Wimsatt
7,139,716 B1 11/2006 Gaziz
7,382,271 B2 6/2008 Mcfarland
7,394,393 B2 7/2008 Zhang et al.
7,415,310 B2 8/2008 Bovee et al.
7,574,417 B1 8/2009 McGreevy et al.
7,912,447 B2 3/2011 Bennett, III et al.
7,925,384 B2 4/2011 Huizenga et al.
8,042,048 B2 10/2011 Wilson et al.
8,156,334 B2 4/2012 Ho
8,190,275 B2 5/2012 Chang
8,261,089 B2 9/2012 Leon Cobos et al.
8,375,118 B2 2/2013 Hao et al.
8,422,401 B1 4/2013 Choong et al.
8,473,325 B2 6/2013 Barnhill, Jr. et al.
8,516,087 B2 8/2013 Wilson et al.
8,670,749 B2 3/2014 Pratt, Jr. et al.
8,671,099 B2 3/2014 Kapoor
8,700,060 B2 4/2014 Huang
8,737,917 B2 5/2014 Desai et al.
8,750,797 B2 6/2014 Ketari
8,775,846 B2 7/2014 Robinson et al.
9,396,599 B1 7/2016 Malhotra
9,544,075 B2 1/2017 Altman et al.
9,549,375 B2 1/2017 Dooley et al.
9,575,472 B1 2/2017 Clayton et al.
9,979,625 B2 5/2018 McLaughlin et al.
10,177,933 B2 1/2019 Burks et al.
10,305,770 B2 5/2019 McLaughlin et al.
10,454,783 B2 10/2019 Burks et al.
11,283,703 B2 3/2022 Abuan et al.
12,231,318 B2 2/2025 Abuan et al.
2001/0030597 A1 10/2001 Inoue et al. ..... G05B 15/02 340/3.7
2002/0044042 A1 4/2002 Christensen et al.
2002/0095568 A1 7/2002 Norris et al.
2002/0180581 A1 12/2002 Kamiwada et al. .. H04L 12/282 340/5.2
2004/0023640 A1 2/2004 Ballai
2004/0133314 A1 7/2004 Ehlers et al.
2004/0260407 A1 12/2004 Wimsatt
2005/0022210 A1 1/2005 Zintel et al.
2006/0029011 A1 2/2006 Etmad et al.
2006/0155980 A1 7/2006 Bodlaender
2006/0168618 A1 7/2006 Choi
2006/0212174 A1 9/2006 Garmon et al.
2007/0112939 A1 5/2007 Wilson et al.
2008/0009324 A1* 1/2008 Patel ..... H04W 48/18 455/566
2008/0065892 A1 3/2008 Bailey et al.
2008/0216371 A1 9/2008 Beale et al.
2008/0222711 A1* 9/2008 Michaelis ..... G07C 9/00039 726/7
2008/0229402 A1 9/2008 Smetters et al.
2008/0238661 A1 10/2008 Camp et al.
2008/0259906 A1 10/2008 Shkedi
2009/0057427 A1 3/2009 Geadelmann et al.
2009/0222659 A1 9/2009 Miyabayashi
2009/0239497 A1 9/2009 Sennett et al.
2009/0291670 A1 11/2009 Sennett et al.
2009/0307255 A1 12/2009 Park
2009/0326800 A1* 12/2009 Kalaboukis ..... H04W 4/02 701/533
2010/0019920 A1 1/2010 Ketari
2010/0091818 A1 4/2010 Sen et al.
2010/0188279 A1 7/2010 Shamilian et al.
2010/0227643 A1 9/2010 Yew et al.
2010/0262829 A1 10/2010 Brown et al.
2011/0021142 A1 1/2011 Desai et al.
2011/0153279 A1 6/2011 Zhang et al.
2011/0195664 A1 8/2011 Keirstead et al.
2011/0196547 A1 8/2011 Park et al.
2012/0001724 A1 1/2012 Belimpasakis
2012/0054493 A1 3/2012 Bradley
2012/0309410 A1 12/2012 Marti et al.
2012/0324124 A1* 12/2012 Locker ..... H04W 72/0486 709/233
2013/0029596 A1 1/2013 Preston et al.
2013/0034230 A1 2/2013 Takahashi
2013/0090061 A1 4/2013 Linde
2013/0101121 A1 4/2013 Nordholt et al.
2013/0117673 A1 5/2013 Hatambeiki et al.
2013/0169407 A1 7/2013 Chen et al.
2013/0173374 A1 7/2013 Weiss
2013/0198516 A1 8/2013 Fenton et al.
2013/0198524 A1 8/2013 Balinsky et al.
2013/0217333 A1 8/2013 Sprigg et al.
2013/0225132 A1 8/2013 Payan et al.
2013/0262898 A1 10/2013 Preston et al.
2013/0268767 A1 10/2013 Schrecker
2014/0006587 A1 1/2014 Kusano
2014/0022061 A1 1/2014 Apte et al.
2014/0052832 A1 2/2014 Dina et al.
2014/0085093 A1 3/2014 Mittleman et al.
2014/0098247 A1 4/2014 Rao et al.
2014/0108255 A1 4/2014 Poligny et al.
2014/0113558 A1 4/2014 Varoglu et al.
2014/0118148 A1 5/2014 Edlund
2014/0143695 A1 5/2014 Sundermeyer et al.
2014/0143784 A1* 5/2014 Mistry ..... G06F 3/0362 718/102
2014/0171114 A1 6/2014 Marti et al.
2014/0187200 A1 7/2014 Reitter et al.
2014/0210616 A1 7/2014 Ramachandran
2014/0222954 A1 8/2014 Vaccari
2014/0321297 A1* 10/2014 Yee ..... H04W 52/0245 370/252
2014/0364149 A1 12/2014 Marti et al.
2015/0073568 A1 3/2015 Jun
2015/0222517 A1 8/2015 McLaughlin et al.
2015/0237071 A1 8/2015 Maher et al.
2015/0334516 A1* 11/2015 Shon ..... H04W 8/005 455/41.1
2015/0341184 A1 11/2015 Tatzel et al.
2015/0350031 A1 12/2015 Burks et al.
2015/0350828 A1 12/2015 Marti et al.
2015/0351038 A1 12/2015 Dooley et al.
2016/0085412 A1 3/2016 Meganathan et al.
2016/0100369 A1* 4/2016 Chhabra ..... H04W 52/0274 370/311
2016/0315688 A1* 10/2016 Bhargava ..... H04B 7/00
2016/0327598 A1 11/2016 Seo
2016/0360526 A1 12/2016 Lehmann et al.
2018/0176112 A1 6/2018 McLaughlin et al.
2023/0023775 A1 1/2023 Abuan et al.

(56) References Cited

U.S. PATENT DOCUMENTS

FOREIGN PATENT DOCUMENTS

| | | | |
|---|---|---|---|
| CN | 101025852 | | 8/2007 |
| CN | 101075913 | | 11/2007 |
| CN | 101197744 | A | 6/2008 |
| CN | 101527911 | | 9/2009 |
| CN | 102281251 | | 12/2011 |
| CN | 102387501 | | 3/2012 |
| CN | 102897501 | A | 3/2012 |
| CN | 102693071 | A | 9/2012 |
| CN | 102710473 | | 10/2012 |
| CN | 202632077 | U | 12/2012 |
| CN | 102932215 | A | 2/2013 |
| CN | 102938729 | A | 2/2013 |
| CN | 202788030 | U | 3/2013 |
| CN | 103210383 | | 7/2013 |
| CN | 103210383 | A | 7/2013 |
| CN | 103501309 | A | 1/2014 |
| CN | 103616876 | A | 3/2014 |
| CN | 103634173 | A | 3/2014 |
| CN | 103713612 | A | 4/2014 |
| CN | 103797750 | A | 5/2014 |
| CN | 105515853 | | 4/2016 |
| CN | 106462123 | A | 2/2017 |
| CN | 105981352 | | 3/2018 |
| EP | 1 125 414 | A2 | 8/2001 |
| EP | 1125414 | | 8/2001 |
| EP | 1133120 | | 9/2001 |
| EP | 1 133 120 | A2 | 12/2001 |
| EP | 1 381 201 | A2 | 1/2004 |
| EP | 1381201 | | 1/2004 |
| EP | 1 659 739 | A2 | 5/2006 |
| EP | 1659739 | | 5/2006 |
| EP | 1 895 401 | A1 | 3/2008 |
| EP | 2148308 | | 1/2010 |
| EP | 2148308 | A2 | 1/2010 |
| EP | 2 784 986 | A1 | 10/2014 |
| EP | 2784986 | | 10/2014 |
| EP | 2 881 676 | A1 | 6/2015 |
| EP | 2881676 | | 6/2015 |
| EP | 3103246 | | 12/2017 |
| EP | 3313050 | | 1/2019 |
| EP | 3149547 | | 6/2019 |
| GB | 2 339 367 | A | 1/2000 |
| GB | 2339367 | | 1/2000 |
| JP | 2004236215 | | 8/2004 |
| JP | 2004236215 | A | 8/2004 |
| JP | 2009212732 | | 9/2009 |
| JP | 2009212732 | A | 9/2009 |
| JP | 5474238 | | 4/2014 |
| JP | 5474238 | B1 | 4/2014 |
| JP | 6166484 | | 7/2017 |
| KR | 101706138 | | 2/2017 |
| TW | 200937931 | | 9/2009 |
| TW | 290937931 | A | 9/2009 |
| TW | 201208321 | | 2/2012 |
| TW | 201208321 | A | 2/2012 |
| TW | 201250481 | | 12/2012 |
| TW | 201250481 | A | 12/2012 |
| TW | 201328401 | | 7/2013 |
| TW | 201540034 | | 10/2015 |
| TW | 201607358 | | 2/2016 |
| TW | I576755 | | 4/2017 |
| TW | I620430 | | 4/2018 |
| TW | I666903 | | 7/2019 |
| WO | 2009/149084 | A2 | 10/2009 |
| WO | 2012115027 | A1 | 8/2012 |
| WO | 2013/049007 | A1 | 4/2013 |
| WO | 2013049007 | | 4/2013 |
| WO | 2013/174540 | A1 | 11/2013 |
| WO | 2013174540 | | 11/2013 |
| WO | 2013/0184108 | A1 | 12/2013 |
| WO | 2013184108 | | 12/2013 |
| WO | 2014/004133 | A1 | 1/2014 |
| WO | 2014004133 | | 1/2014 |
| WO | 2014/020880 | A1 | 2/2014 |
| WO | 2014020880 | | 2/2014 |
| WO | 2015120161 | | 8/2015 |
| WO | 2015184382 | | 12/2015 |
| WO | 2015184387 | | 12/2015 |

OTHER PUBLICATIONS

Accuware Indoor Navigation, Accuware, Available online at: www.accuware.com, 2015, 3 pages.

Bluetooth Low Energy, Wikipedia, Available online at: http://en.wikipedia.org/wiki/Bluetooth_low_energy, Accessed from internet on Apr. 24, 2015, 9 pages.

Bonjour Overview, Available online at: http://www.filibeto.org/unix/macos/lib/dev/documentation/Cocoa/Conceptual/NetServices/NetServices.pdf, May 23, 2006, 32 pages.

Epson 802.11n/Bluetooth 2.1 Wireless Interfaces, Connect-It Wireless Interface Modules, 2013, 2 pages.

GATT Characteristics, Bluetooth Development Portal, Available Online at: https://developer.bluetooth.org/gatt/characteristics/Pages/CharacteristicsHome.aspx, Accessed from Internet on Apr. 24, 2015, 2 pages.

Home Intelligence Advance User's Guide, Fibaro, 8. V111.2012 ver. 1.02\beta, Aug. 14, 2012, 101 pages.

Indoor Navigation and Indoor Positioning Using Bluetooth, Infsoft, Available online at: http://www.insoft.com/blog/2015/indoor-navigation-and indoorpositioning- using-bluetooth, 2015, 2 pages.

The Next Big Thing Indoor Location Beacon Tag & Solutions, Available online at: https://www.sticknfind.com/indoornavigation.aspx, Feb. 16, 2016, 5 pages.

U.S. Appl. No. 14/614,914, Final Office Action mailed on Jul. 7, 2017, 24 pages.

U.S. Appl. No. 14/614,914, Non-Final Office Action mailed on Nov. 4, 2016, 21 pages.

U.S. Appl. No. 14/614,914, Notice of Allowance mailed on Jan. 23, 2018, 11 pages.

U.S. Appl. No. 14/725,891, Final Office Action mailed on Mar. 13, 2017, 20 pages.

U.S. Appl. No. 14/725,891, Non-Final Office Action mailed on Dec. 28, 2017, 11 pages.

U.S. Appl. No. 14/725,891, Non-Final Office Action mailed on Jun. 23, 2016, 16 pages.

U.S. Appl. No. 14/725,891, Notice of Allowance mailed on Jul. 18, 2018, 10 pages.

U.S. Appl. No. 14/725,891, Notice of Allowance mailed on Oct. 18, 2018, 8 pages.

U.S. Appl. No. 14/725,912, Final Office Action mailed on Feb. 6, 2018, 18 pages.

U.S. Appl. No. 14/725,912, Non-Final Office Action mailed on Oct. 1, 2018, 14 pages.

U.S. Appl. No. 14/725,912, Non-Final Office Action mailed on Jun. 2, 2017, 18 pages.

U.S. Appl. No. 14/725,912, Notice of Allowability mailed on Sep. 20, 2019, 2 pages.

U.S. Appl. No. 14/725,912, Notice of Allowance mailed on May 8, 2019, 13 pages.

U.S. Appl. No. 15/274,437, Final Office Action mailed on Nov. 30, 2017, 22 pages.

U.S. Appl. No. 15/274,437, Non-Final Office Action mailed on Apr. 19, 2017, 21 pages.

U.S. Appl. No. 15/407,962, filed Jan. 17, 2017, 25 pages.

U.S. Appl. No. 15/898,092, Non-Final Office Action mailed on Apr. 30, 2018, 22 pages.

U.S. Appl. No. 15/898,092, Notice of Allowance mailed on Feb. 21, 2019, 10 pages.

U.S. Appl. No. 16/405,221, Final Office Action mailed on May 29, 2020, 16 pages.

U.S. Appl. No. 16/405,221, Non-Final Office Action mailed on Nov. 7, 2019, 11 Pages.

Agrawal et al., Bluetooth Navigation System Using Wi-Fi Access Points, School of Electronics Engineering, VIT University, Vellore, 2011, 8 pages.

(56) References Cited

OTHER PUBLICATIONS

Alexandra, Bluetooth Low Energy Solution Released Accurate Real-Time Indoor Localization, Available online at: http://indoo.rs/bluetooth-low-energy-solution, Nov. 27, 2015, 3 pages.
Australian Application No. AU2015214079, Notice of Acceptance mailed on Aug. 29, 2016, 3 pages.
Bekkelien, Bluetooth Indoor Positioning, Master of Computer Science, University of Geneva, Mar. 2012, 56 pages.
Bregman et al., A Universal Implementation Model for the Smart Home, International Journal of Smart Home, vol. 3, No. 3, Jul. 2009, 16 pages.
Cheng et al., Intelligent Home's Scouting-Controlling System Based on Wireless PDA, 2003, pp. 342-346.
Chengqun, Building Electrical Design and Construction Data Set Equipment Type Selection, China Power Press, Dec. 31, 2012, pp. 310-311.
Chinese Application No. CN201580007365.X, Notice of Decision to Grant mailed on Jan. 16, 2018, 4 pages. (2 pages of Original Document and 2 pages of English Translation).
Chinese Application No. CN201580007365.X, Office Action mailed on Mar. 3, 2017, 29 pages. (13 pages of Original Document and 16 pages of English Translation).
Chinese Application No. CN201580007365.X, Office Action mailed on Oct. 10, 2017, 8 pages. (3 pages of Original Document and 5 pages of English Translation).
Chinese Application No. CN201580028720.1, Office Action mailed on Dec. 5, 2018, 25 pages. (11 pages of Original Document and 14 pages of English Translation).
Chinese Application No. CN201580028720.1, Office Action mailed on Jul. 1, 2020, 25 pages. (12 pages of Original Document and 13 pages of English Translation).
Chinese Application No. CN201580028720.1, Supplemental Search Report mailed on Jun. 12, 2020, 1 page.
Chinese Application No. CN201580028720.1, Supplemental Search Report mailed on Sep. 25, 2020, 1 page.
Chinese Application No. CN201580028720.1, Supplemental Search Report mailed on Nov. 23, 2019, 2 pages.
Chinese Application No. Application No. CN201580028840.1, Office Action mailed on Aug. 19, 2019, 32 pages. (14 pages of Original Document and 18 pages of English Translation).
Chinese Application No. CN201810180825.4, Search Report mailed on Jul. 29, 2020, 1 page.
Chinese Application No. Application No. CN201880030148.6, Office Action mailed on Nov. 4, 2020, 10 pages. (0 page of Original Document and 10 pages of English Translation).
Chinese Application No. Application No. CN201880030148.6, Office Action mailed on Apr. 14, 2020, 15 pages. (9 pages of Original Document and 6 pages of English Translation).
Dao et al., Home Appliance Control System Based on Robust Indoor User Localization Using Wifi Signals, International Journal on Human Machine Interaction, vol. 1, Issue 1, 2013, 10 pages.
Echevarria et al., WebTag: Web Browsing into Sensor Tags over NFC, Sensors, vol. 12, 2012, pp. 8675-8690.
European Application No. EP15731760.3, Notice of Decision to Grant mailed on May 31, 2019, 2 pages.
European Application No. EP15731760.3, Office Action mailed on Nov. 13, 2017, 6 pages.
European Application No. EP15731760.3, Summons to Attend Oral Proceedings mailed on Aug. 14, 2018, 6 pages.
European Application No. EP15731760.3, Summons to Attend Oral Proceedings mailed on Jun. 22, 2018, 6 pages.
European Application No. EP15775014.2, Office Action mailed on Jan. 16, 2020, 4 pages.
European Application No. EP17190748.8, Extended European Search Report mailed on Mar. 22, 2018, 4 pages.
European Application No. EP17190748.8, Notice of Decision to Grant mailed on Jan. 7, 2019, 2 pages.
European Application No. EP19151690.5, Extended European Search Report mailed on May 7, 2019, 9 pages.
European Application No. EP19151690.5, Notice of Decision to Grant mailed on Sep. 24, 2020, 2 pages.
European Application No. EP19170567.2, Extended European Search Report mailed on Jul. 5, 2019, 12 pages.
European Application No. EP19170567.2, Office Action mailed on Nov. 11, 2020, 4 pages.
Epson, Connect-It Wireless Interface Modules, Epson 802.11n/Bluetooth 2.1 Wireless Interfaces, 2013, 2 pages.
Fielding et al., Principled Design of the Modern Web Architecture, ACM Transactions on Internet Technology, vol. 2, No. 2, May 2002, pp. 115-150.
Fouladi et al., Hacking Z-Wave Home Automation System, Oct. 3, 2013, 7 pages.
Fouladi et al., Security Evaluation of the Z-Wave Wireless Protocol, Available online at: http://neominds.org/download/zwave_wp.pdf, Oct. 5, 2012, 6 pages.
Han et al., On the Energy Efficiency of Device Discovery in Mobile Opportunistic Networks: A Systematic Approach, IEEE Transaction on Mobile Computing, vol. 14, No. 4, Jun. 23, 2015, 14 pages.
Isomaki et al., On Interworking Between Rapidly Evolving Internet of Things and Open Web Platform, Word Wide Web Consortium, Available Online at: http://www.w3.org/2014/02/woUpapers/isomaki.pdf>, Feb. 20, 2014, 5 pages.
Japanese Application No. 2016-549775, Office Action mailed on Mar. 21, 2017, 4 pages. (2 pages of Original Document and 2 pages of English Translation).
Application No. KR10-2020-7021149, Office Action mailed on Aug. 4, 2020, 6 pages. (4 pages of Original Document and 2 pages of English Translation).
La Delfa et al., Accurate Indoor Navigation Using Smartphone, Bluetooth Low Energy and Visual Tags, Department of Electrical, Electronics and Computer Engineering (DIEEI) University of Catania, Italy, 2014, 4 pages.
Navizon, Navision Indoor Triangulation System (I.T.S.), Available on online at: www.navizon.com, 2015, 2 pages.
International Application No. PCT/US2015/014639, International Preliminary Report on Patentability mailed on Aug. 18, 2016, 7 pages.
International Application No. PCT/US2015/014639, International Search Report and Written Opinion mailed on Jun. 3, 2015, 9 pages.
International Application No. PCT/US2015/033369, International Preliminary Report on Patentability mailed on Dec. 15, 2016, 16 pages.
International Application No. PCT/US2015/033369, International Search Report and Written Opinion mailed on Jan. 19, 2016, 21 pages.
International Application No. PCT/US2015/033369, Invitation to Pay Additional Fees and, Where Applicable, Protest Fee mailed on Nov. 2, 2015, 5 pages.
International Application No. PCT/US2015/033376, International Preliminary Report on Patentability mailed on Dec. 15, 2016, 9 pages.
International Application No. PCT/US2015/033376, International Search Report and Written Opinion mailed on Aug. 7, 2015, 11 pages.
International Application No. PCT/US2015/050433, International Search Report and Written Opinion mailed on Nov. 25, 2015, 10 pages.
International Application No. PCT/US2018/025084, International Preliminary Report on Patentability mailed on Dec. 12, 2019, 8 pages.
International Application No. PCT/US2018/025084, International Search Report and Written Opinion mailed on Jul. 11, 2018, 11 pages.
Rosenberg, A Data Model for Presence, Cisco Systems, Available online at: https://tools.ietf.org/html/rfc4479, Jul. 2006, 35 pages.
Shelby et al., The Constrained Application Protocol (CoAP), Internet Engineering Task Force (IETF), Jun. 2014, 112 pages.
Skelton, Fibaro Z-Wave Home Center 2 Mega Review, Available Online at: http://www.automatedhome.co.uk/reviews/fibaro-z-wave-home-center-2-mega-review.html, Sep. 10, 2012, 39 pages.
Tarkoma et al., Smartphone Energy Consumption, Cambridge University Press, 2014, 7 pages.

(56) References Cited

OTHER PUBLICATIONS

Townsend, Introduction to Bluetooth Low Energy, Product Guide, Available Online At: https://learn. adafruit.com/introdu ction-to-blu etooth-lowenergy/introduction?gclid=EAI aiQobChMij5u_ Om21 g IVBKhpChOTwg 19EAAYASAAEgLI_fD_BwE, Apr. 17, 2014, 11 pages.
Taiwan Application No. TW104104009, Office Action mailed on Mar. 17, 2017, 6 pages. (3 pages of Original Document and 3 pages of English Translation).
Taiwan Application No. TW104117503, Office Action mailed on May 26, 2016, 40 pages.
Taiwan Application No. TW107102237, Office Action mailed on Sep. 28, 2018, 38 pages. (25 pages of Original Document and 13 pages of English Translation).
Ur et al., The Current State of Access Control for Smart Devices in Homes, Workshop on Home Usable Privacy and Security (HUPS), Jul. 2013, 6 pages.
Wu, The Secure Remote Password Protocol, Computer Science Department, Internet Symposium on Network and Distributed System Security, Stanford University, Nov. 11, 1997, 17 pages.
Application No. EP19170567.2 , Office Action, Mailed On Feb. 3, 2022, 4 pages.
Application No. EP20200608.6 , Notice of Decision to Grant, Mailed On Jun. 23, 2022, 2 pages.
Application No. EP21167420.5 , Extended European Search Report, Mailed On Dec. 23, 2021, 11 pages.
Application No. EP22154974.4 , Extended European Search Report, Mailed On May 30, 2022, 8 pages.
Göransson et al., "Professional Android™ Open Accessory Programming with Arduino™", XP055481500, Jun. 3, 2013, 9-12, 48, 54-64, 117-118, 123-131.
"Intention to Grant," mailed May 04, 2017 in European Patent Application No. 15 706 972.5-1853. 8 pages.
"Intention to Grant," mailed Feb. 27, 2019 in European Patent Application No. 15 731 76033-1204. 8 pages.
"Intention to Grant," mailed Feb. 22, 2021 in European Patent Application No. 15 775 014.2-1322 . . . 8 pages.
"Intention to Grant," mailed Jul. 31, 2018 in European Patent Application No. 17190 748.8-1213. 8 pages.
"Intention to Grant," mailed May 4, 2020 in European Patent Application No. 19 151 690.5-1213. 7 pages.
"Intention to Grant," mailed Feb. 23, 2022 in European Patent Application No. 20 200 60836-1213. 8 pages.
"Notice of Allowance," mailed Sep. 7, 2021 in Korean Patent Application No. 10-2021-7026207. 7 pages (Includes English translation of claims only).
"Extended Search Report," mailed Nov. 30, 2021 in European Patent Application No. 21167420.5-1202 / 3872586. 7 pages.
"Office Action," mailed May 5, 2016 in Taiwanese Patent Application No. 104117507. 10 pages (includes English translation).
"Notice of Allowance," mailed Jan. 20, 2017 in Taiwanese Patent Application No. 104117507. 10 pages (includes English translation of allowed claims only).
"Extended Search Report," mailed Jan. 1, 2021 in European Patent Application No. 20200608.6-1213. 5 pages.
"Notice of Allowance," mailed Apr. 3, 2020 in Chinese Patent Application No. ZL201580028840.1. 1—pages (includes English translation of allowed claims only).
"Notice of Decision to Grant," mailed May 28, 2021 in European Patent Application No. 15775014.2-1202 / 3149548. 2 pages.
"Notice of Decision to Grant," mailed May 18, 2021 in Korean Patent Application No. 10-2021-7006945. 7 pages (includes English translation of claims).
"Extended European Search Report," mailed Aug. 18, 2023 in Application No. / Patent No. 23174085.3-1205 / 4236211. 13 pages.
"Intention to Grant," mailed Oct. 25, 2023 from the European Patent Office in Application No. 22 154 974.4-1213. 9 pages.
"Office Action," mailed Feb. 13, 2024 in European Application No. 21 167 420.5-1205. 4 pages.
Final Office Action dated May 22, 2024 in related U.S. Appl. No. 17/949,908 (24 pages).
Chinese Patent Application No. 202011559174.3, "Office Action", May 30, 2025, 7 pages.
European Patent Application No. 21167420.5, "Intention to Grant", Jul. 7, 2025, 8 pages.
U.S. Appl. No. 17/650,589, Notice of Allowance, Mailed On Oct. 23, 2024, 10 pages.
U.S. Appl. No. 17/949,908, "Corrected Notice of Allowability", Apr. 18, 2025, 2 pages.
U.S. Appl. No. 17/949,908, Notice of Allowance, Mailed On Mar. 31, 2025, 10 pages.
Chinese Patent Application No. CN202011559174.3 , Office Action, Mailed On Feb. 20, 2025, 16 pages (7 pages of English translation and 9 pages of official language copy).
European Patent Application EP23174085.3 , "Intention to Grant", Mar. 5, 2025, 9 pages.
U.S. Appl. No. 17/650,589, "Corrected Notice of Allowability", Jan. 15, 2025, 3 pages.
Chinese Patent Application No. CN202011559174.3 , Office Action, Mailed On Nov. 21, 2024, 8 pages (5 pages of English translation and 3 pages of official language copy).
International Search Report and Written Opinion dated Aug. 7, 2015 in PCT/US2015/033376, 22 pages.
International Search Report and Written Opinion dated Nov. 25, 2015, in PCT/US2015/050433. 10 Pages.
International Search Report and Written Opinion dated Jan. 19, 2016, in PCT/US2015/033369. 23 pages.
Fielding, Roy T., et al., "Principled Design of the Modern Web Architecture," ACM Transactions on Internet Technology, May 2002, vol. 2, No. 2, 36 pages.
"Introduction to bluetooth low energy," Product Guide [online], Adafruit Industries, Apr. 17, 2014, [retrieved Apr. 24, 2015], retrieved from the Internet: <URL: https://learn.adafruit.com/introduction-to-bluetooth-low-energy/gatt>, 11 pages.
GATT Specifications, [online], Bluetooth Development Portal, [retrieved Apr. 24, 2015], retrieved from the Internet: <URL: https://developer.bluetooth.org/gatt/Pages/default.aspx>, 1 page.
GATT Descriptors, [online], Bluetooth Development Portal, [retrieved Apr. 24, 2015], retrieved from the Internet: <URL: https://developer.bluetooth.org/gatt/descriptors/Pages/DescriptorsHomePage.aspx>, 1 page.
GATT Services, [online], Bluetooth Development Portal, [retrieved Apr. 24, 2015], retrieved from the Internet: <URL: https://developer.bluetooth.org/gatt/services/Pages/ServicesHome.aspx>, 1 page.
GATT Profiles, [online], Bluetooth Development Portal, [retrieved Apr. 24, 2015], retrieved from the Internet: <URL: https://developer.bluetooth.org/gatt/profiles/Pages/ProfilesHome.aspx>, 1 page.
Rosenberg, J., "A Data Model for Presence," Cisco Systems, Jul. 2006, [retrieved Apr. 24, 2015], retrieved from the Internet: <URL: https://tools.ietf.org/html/rfc4479>, 35 pages.
International Search Report and Written Opinion dated Mar. 6, 2015 in PCT/US2015/014639, 10 pages.
Asensio, Angel, et al., "Protocol and Architecture to Bring Things into Internet of Things," Hindawi Publishing Corporation, International Journal of Distributed Sensor Networks, Apr. 13, 2014, vol. 2014, Article ID 158252, 19 pages.
Shelby, Z., et al., "The Constrained Application Protocol (CoAP)," Internet Engineering Task Force (IETF), Jun. 2014, ISSN: 2070-1721, 112 pages.
Isomaki, Markus, et al., "On interworking between rapidly evolving Internet of Things and Open Web Platform," Feb. 20, 2014, [online], Word Wide Web Consortium, <URL: http://www.w3.org/2014/02/wot/papers/isomaki.pdf>, 5 pages.
Koch, Ed, et al., "Hardware/Software Solution Unifying DALI, IBECS, and BACnet Final Report," [online], Lawrence Berkeley National Laboratory, 2004, LBNL-57686, <URL: http://eetd.lbl.gov/node/51279>, 25 pages.
Andersson, Mats, "Use case possibilities with Bluetooth low energy in IoT applications," White Paper, May 20, 2015, [online], <URL: www.u-blox.com>, 16 pages.
Echevarria, Juan Jose, et al., "WebTag: Web Browsing into Sensor Tags over NFC," Sensors, 2012, vol. 12, pp. 8675-8690.

(56) References Cited

OTHER PUBLICATIONS

International Preliminary Report on Patentability dated Dec. 15, 2016 in International Application No. PCT/US2015/033369. 16 pages.
International Preliminary Report on Patentability dated Dec. 15, 2016 in International Application No. PCT/US2015/033376. 9 pages.
International Application No. PCT/US2015/033369, Invitation to Pay Additional Fees and Partial Search Report, dated Nov. 2, 2015, 5 pages.
Taiwanese Application No. 104117507, Office Action dated May 5, 2016, 6 pages.
International Preliminary Report on Patentability dated Aug. 18, 2016 in International Application No. PCT/US2015/014639. 7 pages.
Notice of Allowance dated Jan. 26, 2017 in Taiwanese Patent Application No. 104117507. 10 pages. (English translation of Replacement Claims provided).
Final Office Action dated Jul. 7, 2017 in U.S. Appl. No. 14/614,914. 4 pages.
Non-Final Office Action dated Jun. 2, 2017 in U.S. Appl. No. 14/725,912. 18 pages.
Notice of Decision to Grant dated Jun. 5, 2017 in Japanese Patent Application No. 2016-549775. 10 pages (English Translation of Claims Only).
Z-Wave Fibaro Home Center 2 System Advanced Users Guide, published Aug. 14, 2012. 8.VIII.2012 ver. 1.02\beta. 102 pages.
Fibaro Z-Wave Home Center 2 Mega Review, May 25, 2017. 37 pages.
Fouladi, Behrang et al., "Hacking Z-Wave Home Automation Systems." Oct. 3, 2013. 7 pages.
Honeywell, "Tuxedo Touch WiFi Home Automation System—Installation and Setup Guide." Published Aug. 4, 2012. 49 pages.
Office Action dated Mar. 17, 2017 in Taiwanese Patent Application No. 104104009. 6 pages (English Translation).
Office Action dated Mar. 21, 2017 in Japanese Patent Application No. 2016-549775. 11 pages (English Translation Included).
Wu, Thomas, "The Secure Remote Password Protocol." Computer Science Department, Stanford University. Nov. 11, 1197. 1998 Internet Society Symposium on Network and Distributed System Security. 17 pages.
Notification of the Second Office Action dated Oct. 10, 2017 in Chinese Patent Application No. 201580007365.X. 7 pages includes English translation.

* cited by examiner

400

| | CONTROLLER ID (402) | LTPKC (404) | PRIVILEGE (406) |
|---|---|---|---|
| 410 | Dad's computer | <encrypted> | Admin |
| 412 | Dad's phone | <encrypted> | User |
| 414 | Mom's phone | <encrypted> | Admin |
| 416 | Jill's phone | <encrypted> | User |
| 418 | Jack's phone | <encrypted> | User |

CONTROLLER NETWORKS FOR AN ACCESSORY MANAGEMENT SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

This application *is a continuation of U.S. patent application Ser. No. 14/725,891, filed May 29, 2015* (*now U.S. Pat. No. 10,177,933, which* claims the benefit of U.S. Provisional Application No. 62/005,764, filed May 30, 2014, entitled "Networking, Communication and Security for an Accessory Management System," and also claims the benefit of U.S. Provisional Application No. 62/094,391, filed Dec. 19, 2014, entitled "Networking, Communication and Security for an Accessory Management System." The disclosures [of both applications] are incorporated by reference herein in their entirety.

This disclosure is also related to U.S. application Ser. No. 14/614,914, filed Feb. 5, 2015 and U.S. Provisional Application No. 61/935,967, filed Feb. 5, 2014, the disclosures of which are incorporated by reference herein in their entirety.

This disclosure is also related to U.S. application Ser. No. 14/725,912 filed May 29, 2015, the disclosure of which is incorporated by reference herein in its entirety.

BACKGROUND

The present disclosure relates in general to an accessory management system and in particular to controller networks for an accessory management system.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, household appliances, etc.

SUMMARY

At present, it can be difficult for a user to manage multiple electronically controllable devices or systems. For instance, a user's home might have a thermostat, an electronically controllable lighting system, a home security system, and so on. Each such system can be made by a different manufacturer, and each manufacturer may provide a dedicated controller device (e.g., IR-based remote control device) or a controller application program (or "app") that the user can install and run on a general-purpose device such as a smart phone, tablet, or home computer system. Each controller device or app is typically customized for a particular manufacturer's devices and may not be interoperable with devices from other manufacturers or even with other devices from the same manufacturer. Such a piecemeal approach is not readily scalable. A user seeking to create a "smart home" environment or the like, with an array of disparate devices that can be centrally controlled or managed, is confronted with the need to accumulate a plethora of controller devices and/or controller apps.

Certain embodiments of the present invention can operate in the context of protocols for communication between a controller device (or "controller") and any number of other electronic devices that are to be controlled (referred to herein as "accessory devices" or simply "accessories"). A controller can be implemented, for example, on a general-purpose computing device such as a desktop computer, laptop computer, tablet computer, mobile phone, smart phone, other handheld or wearable computing device, by providing the general-purpose computing device with appropriate executable program code; alternatively, a controller can be a special-purpose computing device. An accessory can include any device that is controllable by a controller. Examples of accessories include light fixtures, thermostats, door locks, automatic door openers (e.g., garage door opener), still or video cameras, and so on. Accessories and controllers can communicate with each other via wired or wireless channels using standard transport protocols such as Wi-Fi networks, Bluetooth, Bluetooth LE, or the like. It is to be understood that other communication protocols and transports can be used.

In some embodiments, a "uniform" accessory protocol can be provided via which controllers can send command-and-control messages to the accessory and receive responses from the accessory in a uniform format, regardless of the type or functionality of the accessory. For instance, an accessory can be defined as a collection of services, with each service being defined as a set of characteristics, each of which has a defined value at any given time. These characteristics can represent various aspects of the accessory's state. The protocol can define message formats via which a controller can interrogate (e.g. by reading) and update (e.g., by writing) characteristics of an accessory (singly or in groups), thereby allowing the controller to determine and/or change the accessory's state. Accordingly, any type of accessory, regardless of function, can be controlled in a consistent manner.

In some embodiments, the protocol can define security measures that can be used to prevent unauthorized controllers from operating an accessory. For example, an accessory can be configured to accept requests only from a controller that has previously established a pairing with the accessory and is therefore recognized by the accessory. The protocol can specify the pairing procedures so as to minimize risk of a pairing occurring without approval of the accessory's rightful owner/operator. Further, the protocol can specify end-to-end message encryption such that only the particular controller and accessory can decrypt messages exchanged between them.

Certain aspects of the present invention may relate to controller networks, where multiple controllers can establish pairings with or otherwise be configured to communicate with the same accessory (or the same set of accessories, such as an accessory network). In some controller networks, one or more controllers can establish a level of privilege (e.g., an "admin" privilege) with an accessory that permits these controllers to determine whether other controllers should be granted permission to communicate command-and-control messages to the accessory. For instance, a first controller can establish a pairing with an accessory. Establishing the pairing can involve providing a long term public key of the first controller to the accessory and receiving in exchange a first long term public key for the accessory. Other operations (e.g., an out-of-band PIN or passcode exchange) can also be involved in establishing the pairing. Separately from any communication with the accessory, the first controller can obtain a long term public key for a second controller. The first controller can establish a verified session with the accessory using the first long term public key received during pair establishment. The verified session can have a session key, and all communication within the verified session can be encrypted using the session key. Within the verified session, the first controller can perform a pair add operation with the accessory to establish a pairing between the accessory and a second controller. The pair add operation can include providing the long term public key for the second controller to the accessory and receiving in exchange a second long term public key for the accessory (which might or might not be the same key received when the first controller established its pairing). The first controller can communicate the second long term public key for the accessory to the second controller. This process can establish a pairing between the second controller and the accessory; thereafter, the second controller can establish its own verified session to send command-and-control messages to the accessory. The first controller can repeat the pair add process to establish pairings between the accessory and any number of controllers.

In some instances, the first controller can instruct the accessory to grant an administrator (or "admin") privilege to the second controller. Granting this privilege can allow the second controller to perform pair add operations to add additional controllers if desired, and depending on implementation, the second controller might or might not be able to grant admin privilege to the additional controllers. The admin privilege can be automatically assigned to the first controller that establishes a pairing with a brand-new accessory (or with an accessory that has no established pairings). The use of an admin privilege can help device owners to regulate which controllers can obtain access to a particular accessory.

In some controller networks, one or more controllers can be operable as a proxy for communicating with an accessory. For example, the accessory may be configured to communicate only with controller devices that are physically present in a local environment (such as being on a local area network, which can be wired or wireless as desired, or being within range of a point-to-point wireless communication protocol such as Bluetooth). A controller device that is not physically present in the local environment can establish communication with another controller (a proxy device, or proxy) that is physically present in the local environment with the accessory, and the proxy can relay messages and responses between the remotely-located controller device and the accessory. The remotely-located controller and accessory can establish a pair-verified session and encrypt their communications; the proxy need not be able to read the messages and responses, only to relay them as-received. In some embodiments, a controller that is acting as a proxy for another controller may be required to establish its own pair-verified session with the accessory before the accessory will accept any messages relayed by the proxy. In some embodiments, the proxy and the other controller can also establish a pair-verified session between themselves, and this can provide further protection against unauthorized access.

In some embodiments, the controller can prefer direct communication when possible and use a proxy when the accessory is not directly reachable. For instance, after establishing a pairing with the accessory, the controller might receive a user input (or other input) requesting an interaction with the accessory (e.g., to check or change its state). In response to the input, the controller can determine whether the accessory is directly reachable, e.g., whether the controller and the accessory are on the same local area network. If so, then the controller can communicate directly with the accessory to establish a pair-verified session and exchange command-and-control messages. If the accessory is not directly reachable, the controller can attempt to identify a proxy that is reachable, e.g., through a local area network or wide area network. The accessory can establish communication with the proxy, then communicate with the accessory through the proxy.

In some embodiments, a proxy can be any controller that has established a pairing with the accessory and is present in the local environment of the accessory. A proxy can receive a request from a controller to communicate with the accessory. In response, the proxy can establish its own pair-verified session with the accessory. Messages received from the controller can be relayed to the accessory through the pair-verified session, and messages received from the accessory through the pair-verified session can be relayed to the controller. The proxy can be agnostic to the content of the messages it relays; thus, for instance, the controller and accessory can send encrypted messages using a key (e.g., their own pair-verified session key) that is not known to the proxy. The proxy can continue relaying messages until one or the other (or both) of the controller and the accessory send a message indicating that relaying can be discontinued. At that point, the proxy can end its verified session and discontinue relaying of messages.

A proxy of this kind can provide a relaying function that can extend the physical range of a controller network without requiring the accessories to be connected to a wide area network. Some proxies, referred to as coordinators, can provide additional functions rather than simply relaying messages. For example, a coordinator can mediate access to an accessory (or group of accessories such as an accessory network). The coordinator can establish a pairing with the accessory and can remain in the local environment with the accessory. Other controllers can establish a pairing with the coordinator in addition to or instead of establishing a pairing with the accessory. During a pair-verified session between a controller and the coordinator, the controller can send instructions to the coordinator to control the accessory. The coordinator can establish a pair-verified session with the accessory and provide corresponding command-and-control messages to the accessory. The coordinator can receive the responses from the accessory and send corresponding responses to the controller. In this configuration, the coordinator can read the controller's messages to the accessory and the accessory's responses to the controller. Access to the accessory can be controlled by controlling access to the coordinator. For example, the accessory may be configured to establish a pairing only with the coordinator. Further, in situations where multiple controllers may attempt to control the same accessory at the same time, the coordinator can coordinate their actions, e.g., implementing priority logic to resolve conflicting instructions, etc. In some embodiments, a coordinator can also enforce access restrictions on a per-controller or per-accessory basis. A coordinator is not required, but where a coordinator is present, some embodiments may require or prefer that communication with accessories proceed through a coordinator.

The following detailed description together with the accompanying drawings will provide a better understanding of the nature and advantages of the present invention.

DETAILED DESCRIPTION

Example Environment

Figure 1:
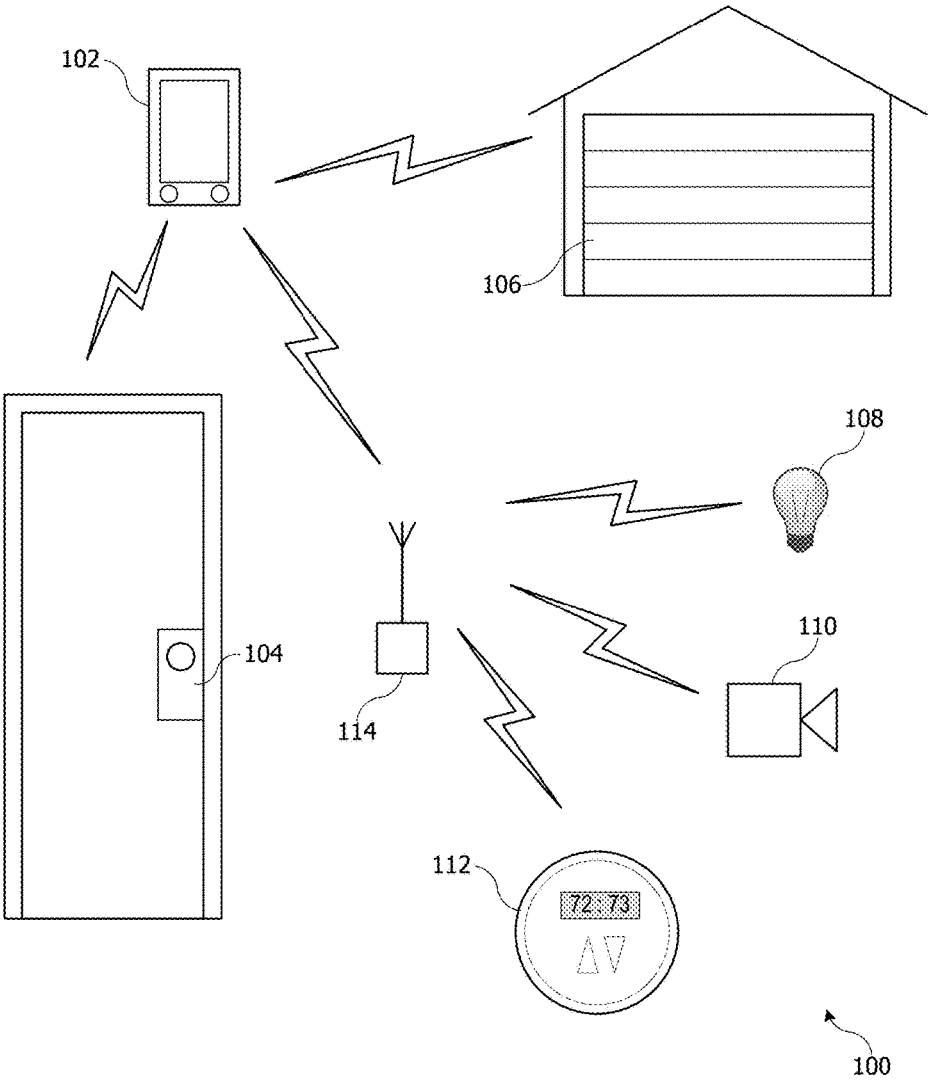
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. Provisional Application No. 61/935,967 and U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). In some embodiments, an intermediary can function as a proxy or coordinator as described below.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions can be configured and controlled, for example, using techniques described below and in above referenced U.S. Provisional Application No. 62/005,764, U.S. Provisional Application No. 62/094,391, and U.S. application Ser. No. 14/725,912.

In some embodiments, a uniform accessory protocol can facilitate communication by a controller 102 with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. Examples of an accessory model based on services and characteristics are described in above-referenced U.S. Provisional Application No. 61/935,967 and U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. In some embodiments, message formats may be transport-dependent while conforming to the same accessory model. Examples of message formats are described in above-referenced U.S. Provisional Application No. 61/935,967 and U.S. application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. Provisional Application No. 61/935,967 and U.S. application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. Provisional Application No. 61/935,967 and U.S. application Ser. No. 14/614,914.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be uniformly applied in any context with one or more controllers and one or more accessories, regardless of accessory function or controller form factor or specific interfaces.

Example Controller Networks

Figure 2:
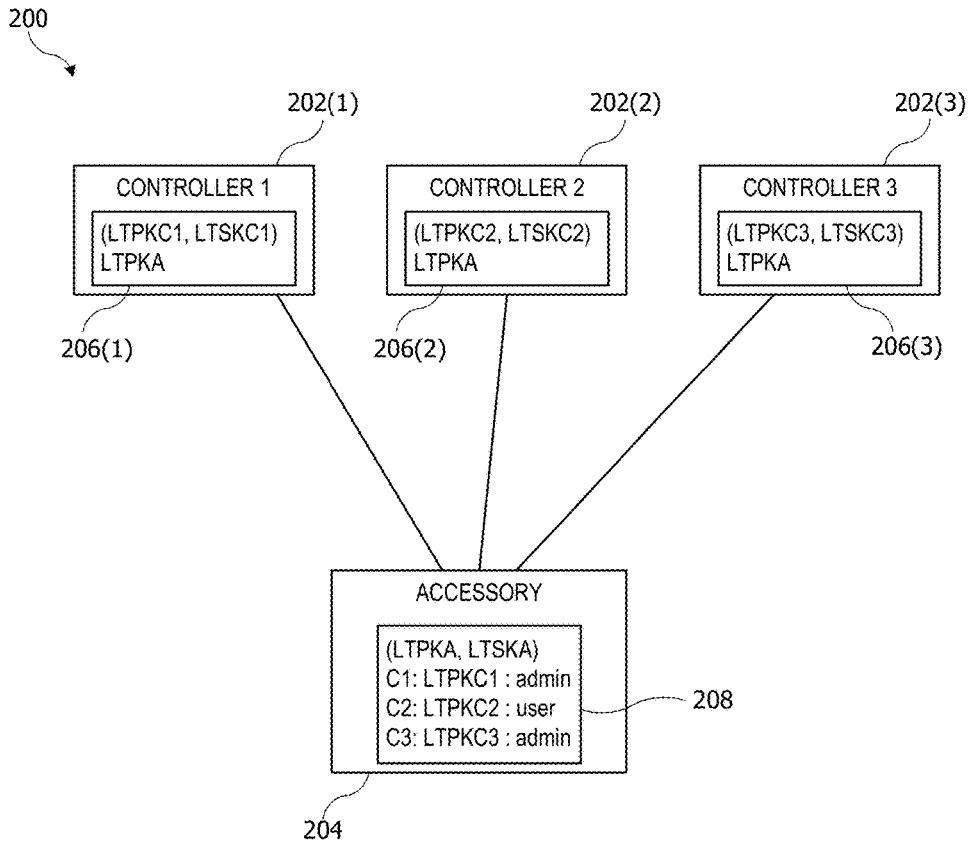
FIG. 2 shows an example of a controller network with multiple controllers that have established pairings with an accessory according to an embodiment of the present invention.

In some embodiments, multiple controllers can control an accessory. FIG. 2 shows an example of three controllers 202(1)-202(3), each of which has established a pairing with accessory 204. Accordingly, each of controllers 202(1)-202(3) has stored a copy of a long-term public key (LTPKA) of accessory 204 e.g., within secure storage elements 206(1)-206(3), and accessory 204 has stored a copy of a long-term public key (LTPKC1, LTPKC2, LTPKC3) of each of controllers 202(1)-202(3), e.g., within secure storage element 208. Each device 202, 204 can also have, within its own secure storage element 206, 208, its own long-term public key and a corresponding long-term secret key (LTSK) as shown. Secure storage elements 202, 208 can be, for example, integrated circuits that implement cryptographic algorithms and/or provide secure information storage capabilities; examples are described below. In some embodiments, long-term public keys are exchanged between devices in encrypted form and are decrypted and stored within secure storage elements 202, 208. This can help prevent unauthorized devices (e.g., an unauthorized controller) from learning another device's (e.g., an accessory's) public key.

In some embodiments, each controller 202 can independently perform a pair setup operation with accessory 204. As used herein, a pair setup operation can include any sequence of communications that results in exchange of long-term public keys between the controller and accessory. Pair setup operations can also include an out-of-band communication to verify that a user has authorized the pairing and/or to establish a shared secret for purposes of exchanging long-term public keys in encrypted form. For example, accessory 204 can provide a PIN (personal identification number) or other passcode (e.g., any alphanumeric sequence), and the user can be prompted to enter the PIN or passcode directly into a user interface of controller 202 during pair setup. The PIN or passcode can be randomly generated by the accessory or pre-assigned by a manufacturer. For improved security, the PIN or passcode can be independent of any other accessory-identifying information such as manufacturer, model, or serial number. As another example, out-of-band communication can include communicating a PIN or other information between the devices via a short-range channel such as near-field communication (NFC), Bluetooth LE, image-based information exchange (e.g., where one device presents an image, such as a QR code or the like, that is captured by a camera of the other device and processed to extract information), which can provide verification that the controller and accessory are in physical proximity at the time of pair setup. Specific examples of pair setup operations that can be used are described in above-referenced U.S. Provisional Application No. 61/935,967 and U.S. application Ser. No. 14/614,914.

In some embodiments, pairing with an accessory can be further restricted. For example, suppose that controller 202(1) is the first controller to perform pair setup with accessory 204. Controller 202(1) can be granted an administrator (or "admin") privilege by accessory 204 by virtue of being the first to perform pair setup. Accessory 204 can store information indicating which controllers have admin privilege, e.g., in secure storage element 208. Thereafter, any other controllers 202 can be restricted from performing pair setup with accessory 204, except as authorized by controller 202(1). For instance, after performing pair setup with controller 202(1), accessory 204 can refuse to perform pair setup with any other controller unless the pairing with controller 202(1) is first removed (e.g., using a pair remove process as described in above-referenced U.S. Provisional Application No. 61/935,967 and U.S. application Ser. No. 14/614,914). While controller 202(1) remains paired, new pairings can be added via controller 202(1). For example, controller 202(1) can obtain the long-term public key (LTPKC2) of controller 202(2) and provide LTPKC2 to accessory 204 using a pair add process (e.g., as described in above-referenced U.S. Provisional Application No. 61/935,967 and U.S. application Ser. No. 14/614,914). Controller 202(3) and any number of other controllers can be added in a similar fashion.

Alternatively, after controller 202(1) has performed pair setup, other controllers such as controller 202(2), 202(3) can be allowed to perform pair setup only if controller 202(1) is in a pair-verified session with accessory 204 and provides an instruction authorizing the new pair setup to occur. For example, if accessory 204 receives a request from controller 202(2) to perform pair setup, accessory 204 can send a notification to controller 202(1) indicating that controller 202(2) is attempting to perform pair setup. Controller 202(1) can alert a user, who can indicate whether the pair setup should be allowed or refused. Controller 202(1) can communicate the user's decision to accessory 204, and accessory 204 can proceed accordingly.

In some embodiments, controller 202(1), or any other controller that has admin privilege, can grant admin privilege to other controllers. For example, while in a pair-verified session with accessory 204, controller 202(1), which has admin privilege, can obtain from accessory 204 a list of all controllers (e.g., controllers 202(2), 202(3)) for which accessory 204 has a long-term public key. Controller 202(2) can identify another controller, e.g., controller 202(3) as an admin, and accessory 204 can grant controller 202(3) admin privilege. As another example, during a pair add process, controller 202(1) can indicate to accessory 204 whether the controller being added is to be granted admin privilege or not. In this example, any controller with admin privilege can grant admin privileges to other controllers. In some instances, accessory 204 can limit the total number of controllers with which pairings can concurrently exist and/or the number of controllers granted admin privilege.

As described above, controllers with admin privilege can add or remove other controllers to or from an accessory's list of paired controllers. It is to be understood that controllers with admin privilege can also control operation of the accessory, e.g., by writing values to characteristics as described in above-referenced U.S. Provisional Application No. 61/935,967 and U.S. application Ser. No. 14/614,914. Paired controllers without admin privilege can be said to have "user" privilege. Such controllers can control operations of the accessory but cannot add or remove other controllers to or from the accessory's list of paired controllers. In some embodiments, other levels of privilege can be defined in addition to or instead of admin and user levels. For example, a controller might be authorized to control some but not all functions of a multifunctional accessory, or a controller's privilege might be limited based on time, location, duration of use of the accessory, etc. Regardless of the number or complexity of privilege levels, controller privileges can be managed in the manner described herein. For instance, the first controller to pair with an accessory can automatically have admin privilege (the highest level of privilege) and can grant the same level or any or lower level of privilege to other controllers. Similarly, a controller with admin privileges can also revoke the privileges of other controllers. In some embodiments, the first controller to pair with an accessory can be granted a special status such that other controllers cannot revoke its privilege, although the controller can revoke its own privilege, e.g., using a pair remove process.

It will be appreciated that controller network 200 is illustrative and that variations and modifications are possible. Any number of controllers can establish pairings with an accessory, and each controller can be any type of electronic device that supports user interaction (e.g., through a local or remote user interface) and that can communicate with other devices via wired and/or wireless channels. Examples include mobile phones, tablets, wearable devices, laptop computers, desktop computers, dedicated accessory-control base stations, and so on. The accessory can be any electronic device that has a controllable function and that is capable of communicating with other devices via wired and/or wireless interfaces. Examples include lamps (or lights), fans, thermostats, appliances (refrigerator, oven, dishwasher, clothes washer, clothes dryer, vacuum cleaner, etc.), door locks, door openers, media storage and/or playback devices (TV, cable or satellite television interface unit, DVD player, digital video recorder, digital music player, streaming media device, etc.), and so on. Further, a single controller can establish pairings with multiple accessories, and the same controller can have the same privilege level or different privilege level, with respect to different accessories.

Figures 3, 4:
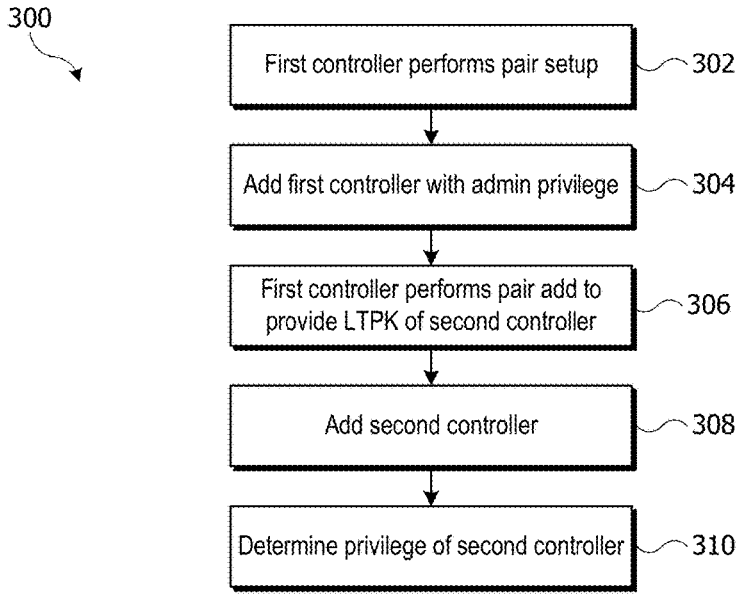
FIG. 3 is a flow diagram of a process for establishing pairings between multiple controllers and an accessory according to an embodiment of the present invention.
FIG. 4 shows an accessory authorization table according to an embodiment of the present invention.

FIG. 3 is a flow diagram of a process 300 for establishing pairings between multiple controllers (e.g., controllers 202(1)-202(3) of FIG. 2) and an accessory (e.g., accessory 204) according to an embodiment of the present invention. Process 300 can begin at a time when accessory 204 has no established pairing to any controller, for example when accessory 204 is new out of the box or after all previously established pairings have been removed.

At block 302, a first controller (e.g., controller 202(1)) can perform pair setup to establish a pairing with accessory 204. As described above, establishing a pairing can include a secure exchange of long-term public keys (LTPKA and LTPKC1) as well as out-of-band operations to confirm that controller 202(1) should be allowed to establish the pairing.

At block 304, assuming pair setup was successful, accessory 204 can automatically grant admin privilege to controller 202(1). This can be automatic because no other pairings exist. Thus, in this example, the first controller to establish a pairing with an accessory is automatically an administrator to that accessory. Accessory 204 can record the privilege level of controller 202(1), e.g., in association with the long-term public key LTPKC1, in secure storage element 208.

At block 306, controller 202(1) can perform a pair add process (e.g., as described in above-referenced U.S. Provisional Application No. 61/935,967 and U.S. application Ser. No. 14/614,914) to add another controller, e.g., controller 202(2). For example, controller 202(1) can communicate with controller 202(2) to obtain its long-term public key (LTPKC2), which it can exchange with accessory 204 using a pair add process. At the conclusion of the pair add process, controller 202(1) can forward the long-term public key (LTPKA) received from accessory 204 during the pair add process to controller 202(2). In some embodiments, the exchange of these long-term public keys between controllers 202(1) and 202(2) can be performed over a short-range communication channel, and/or user input can be required by one or both controller to confirm the sources of the keys.

At block 310, accessory 204 can determine a privilege level for controller 202(2). In some embodiments, controller 202(1) can indicate the privilege level during the pair add process, and if no privilege level is specified, a default privilege level (e.g., user privilege as described above) can be assumed. In some embodiments, accessory 204 can request that controller 202(1) specify a privilege level. Accessory 204 can record the privilege level of controller 202(2), e.g., in association with the long-term public key LTPKC2, in secure storage element 208.

Blocks 306-310 can be repeated to establish pairings of any number of controllers 202 with accessory 204. In some embodiments, any controller with admin privilege can add pairings using blocks 306-310. In some embodiments, only the first controller can grant admin privilege to other controllers, while in other embodiments, any controller that has admin privilege can grant admin privilege to others.

FIG. 4 shows an accessory authorization table 400 according to an embodiment of the present invention. All or part of accessory authorization table 400 can be stored, e.g., in secure storage element 208 of accessory 204 of FIG. 2. Accessory authorization table 400 can be built up through execution of process 300 of FIG. 3 or portions thereof. For each controller with which a pairing has been established, accessory authorization table 400 can store a controller identifier (ID) (field 402), a long-term public key LTPKC (field 404), and a privilege indicator (field 406). The controller identified in field 402 can be any identifier that facilitates recognition of the controller by the accessory; while user-friendly names are shown as an example, the controller identifier can be anything that uniquely identifies a particular controller to an accessory (e.g., a unique device identifier assigned to the controller, MAC address of the controller, or the like).

For example, "Dad's computer" 410 (which in this example belongs to a user named Dad) can be the first controller to pair with accessory 204 and can have admin privilege as a result of execution of blocks 302 and 304 of process 300 described above. Dad can then add his phone 412 as a second controller using blocks 306-310 of process 300 described above. In this example, Dad's phone has only been granted user privilege (perhaps because Dad feels his phone is not sufficiently secure and prefers not to have admin privilege on the phone). Dad can also add Mom's phone 414 (which belongs to a user named Mom) and grant admin privilege using blocks 306-310 of process 300.

Since both Mom and Dad have controllers with admin privilege, either Mom or Dad can use blocks 306-310 of process 300 to add Jill's phone 414 and Jack's phone 416. (For example, Jill and Jack might be children who live with Mom and Dad.) In this example, Jill's phone 414 and Jack's phone 416 are granted only user privilege and cannot be used to add or remove other controllers to or from table 400.

LTPKC field 404 is shown as storing an encrypted copy of the controller's long-term public key, which can be obtained for a given controller during a pair setup or pair add operation.

Encryption of LTPKC field 404 can use a key known only to the accessory. In some embodiments, long-term public keys can be protected by storing them in a secure storage element of the accessory (examples are described below). Further, security measures for stored long-term public keys need not be required.

It will be appreciated that process 300 and table 400 are illustrative and that variations and modifications are possible. Process steps described as sequential may be executed in parallel, order of steps may be varied, and steps may be modified, combined, added or omitted. Any number of controllers can be added, and there can be more privilege levels. In some embodiments, privileges can be managed per user rather than per device, in which case some or all of a user's devices can automatically have the same privilege level. For example, user "Dad" of FIG. 4 might have a phone and a tablet that are synchronized through a common user identifier of user Dad. This identifier can be, e.g., an account identifier of an account maintained for user Dad at a cloud-based service that supports data backup, synchronization, and/or other services for user devices. Dad can associate the account identifier (e.g., user name and password) with the tablet or the phone, e.g., by registering the devices with the service. A long-term public/secret key pair can be associated with Dad's account and provided by the service to each of Dad's devices that is associated with Dad's account, e.g., in connection with a digital certificate. Each device can thus use the same (LTPKC, LTSKC) pair when communicating with an accessory. Table 400 can associate the privilege level with a particular LTPKC rather than a particular controller device, so that if the LTPKC for user Dad has admin privilege, any controller that has that LTPKC and can establish a pair verified session with the accessory is granted user privilege. Further, all controllers with the same (LTPKC, LTSKC) pair can identify themselves to accessories with the same controller ID, which can be derived from Dad's account ID.

The controller network shown in FIG. 2 allows multiple controllers 202 to control an accessory 204. In principle, communication between controllers 202 and accessory 204 can take place via any type of transport or communication channel, including local area networks, wide area networks, the Internet, and so on. However, for various reasons, it may be desirable not to connect accessory 204 to any wide area networks. Thus, access to an accessory may be limited to controllers 202 that are currently on a local area network, or LAN, with accessory 204 (such as a particular Wi-Fi network to which accessory 204 is joined) or that are in range of a short-range point-to-point communication channel such as a Bluetooth or Bluetooth LE channel. Where this is the case, controllers 202 in FIG. 2 would only be able to operate accessory 204 while connected to the same LAN or otherwise within range of accessory 204. Thus, for example, it might be possible for controller 202(1) to control accessory 204 while both are in the same building (e.g., in the home or other environment where accessory 204 is located) but not while controller 202(1) is far away (e.g., on the other side of town).

Figure 5:
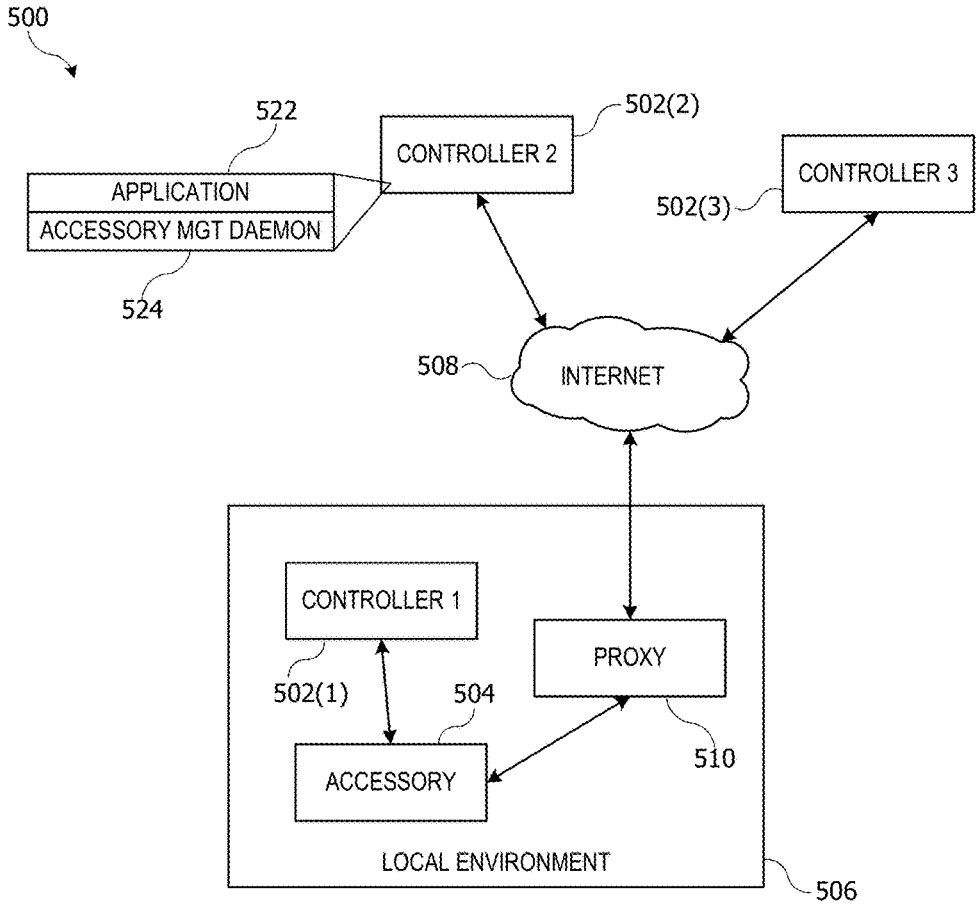
FIG. 5 shows another controller network configuration according to an embodiment of the present invention

FIG. 5 shows another network configuration 500 according to an embodiment of the present invention. Configuration 500 allows controllers to communicate with an accessory via a proxy. Controllers 502(1)-502(3) can be similar to controllers 202 of FIG. 2, and accessory 504 can be similar to accessory 204 of FIG. 2. In this example, controller 502(1) is currently located in a local environment 506 with accessory 504. For example, controller 502(1) and accessory 504 can be on the same local area network (LAN), such as a Wi-Fi network or within Bluetooth range or the like. Controllers 502(2) and 502(3) are currently located outside local environment 506 but are connected to a communication network 508 (e.g., the Internet or other wide area network); such controllers are said to be "remote" from accessory 504. It is to be understood that controllers 502 can be mobile devices that are sometimes within local environment 506 and sometimes outside local environment 506. Further, in this example, accessory 504 communicates only within local environment 506.

A proxy device (or "proxy") 510 can facilitate communication between remote controllers 502(2), 502(3) and accessory 504. Proxy 510 can be any electronic device that is present in local environment 506 and capable of communicating with accessory 504. In some instances, proxy 510 can be another controller that happens to be in local environment 506. Proxy 510 can be a device that is not likely to leave local environment 506, such as a desktop computer, a wireless-network access point device, a dedicated accessory-controller (base station) device, or the like. Proxy 510, unlike accessory 504 in this example, can be connected to network 508 such that it is possible for controllers 502(2), 502(3) to locate and communicate with proxy 510.

In some embodiments, proxy 510 can act as a relay between remote controllers 502(2), 502(3) and accessory 504. Proxy 510 can have its own pairing established with accessory 504 (e.g., using a pair setup or pair add process), as can controllers 502(2), 502(3). In operation, a remote controller, e.g., controller 502(2), can establish a connection (e.g., a pair-verified session) with proxy 510 and send a message to proxy 510 indicating that it wishes to communicate with accessory 504. Proxy 510 can establish a connection (e.g., a pair-verified session) with accessory 504 and use that session to relay messages between controller 502(2) and accessory 504. For example, through the relay, controller 502(2) can establish its own pair-verified session with accessory 504, then send control messages and receive responses within the pair-verified session. Proxy 510 can pass the messages back and forth (optionally adding its own authenticated signature or encryption layer) while remaining agnostic to their content. A specific implementation is described below with reference to a "tunnel" proxy.

From a user's perspective, operation of controller 502(2) to control accessory 504 can be the same regardless of whether the connection to accessory 504 is direct or through proxy 510. For example, as shown in FIG. 5 for controller 502(2), any controller can execute an accessory-control application 522 that generates a user interface (such as a graphical user interface) for controlling accessory 504. The user interface can include display elements to display current settings of accessory 504, user-operable controls to change some or all of the settings, etc. Accessory-control application 522 can interact with an operating-system process 524 (referred to herein as an "accessory management daemon") that manages the communication between controller 502 and accessory 504. Accessory management daemon 524 can present an application program interface (API) to application 522 in a manner that is transport-agnostic, so that application 522 can, for instance, invoke an API function indicating that a message should be sent to accessory 504. Accessory management daemon 524 can, transparently to the user, create either a direct or indirect (e.g., through proxy 510) communication path to accessory 504 and send the message. In some embodiments, accessory management daemon 524 can also handle operations such as pair verify and encryption/decryption of communications within a pair-verified session, transparently to application 522.

Figure 6:
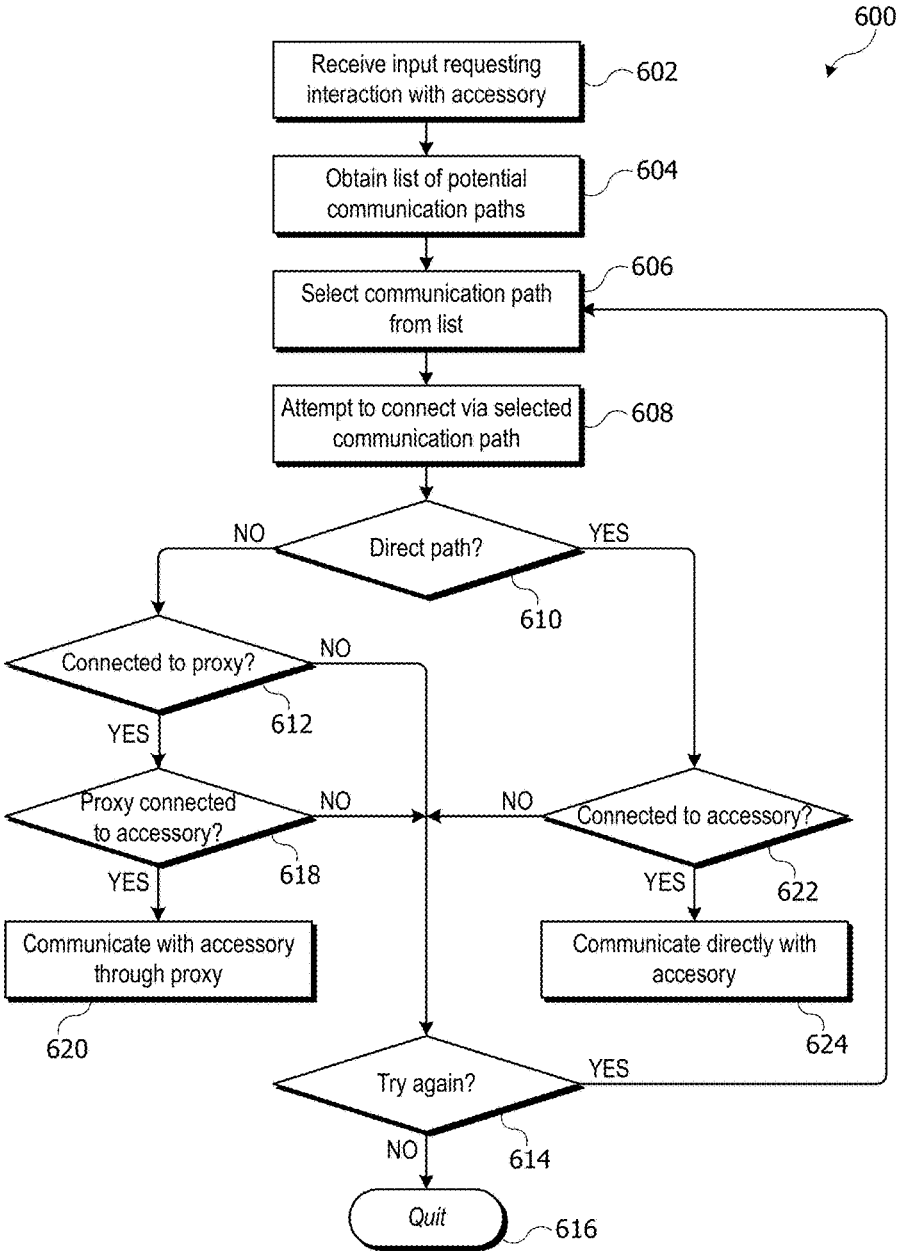
FIG. 6 is a flow diagram of a process usable to establish communication with an accessory via a proxy according to an embodiment of the present invention.

FIG. 6 is a flow diagram of a process 600 that accessory management daemon 524 (or other process in a controller, such as any of controllers 502 of FIG. 5) can use to communicate with an accessory (e.g., accessory 504) according to an embodiment of the present invention. Process 600 can be used, e.g., to support a controller network configuration such as configuration 500 of FIG. 5.

At block 602, process 600 can receive input requesting interaction with an accessory. For example, the user can interact with an application program to indicate a desire to communicate with accessory 504, and the application program can invoke an appropriate API function call to accessory management daemon 524 (directly or through intervening software support layers) to start a pair-verified session with accessory 504.

At block 604, process 600 can obtain a list of potential communication paths to accessory 504. In some instances, at least one potential communication path can be a "direct" path. For example, as described above, accessory 504 might be reachable on a LAN if controller 502 is connected to the same LAN, as is the case for controller 502(1) in FIG. 5. In addition or instead of a direct path, one or more "indirect" potential communication paths may also be available via a proxy (e.g., proxy 510), and block 604 can include obtaining a list of potential proxy devices. The list can be obtained using various techniques. In some embodiments, at a time when a particular controller 502(2) has a verified session with accessory 504, that controller 502(2) can receive from accessory 504 a list of all authorized controllers. Controller 502(2) can store the list for later use, and block 608 can include accessing the most recently received list. In some embodiments, controller 502(2) can obtain a list of authorized controllers and/or proxies for an accessory (or a network of accessories) from a cloud-based data service, or as part of an environment model shared among controllers, e.g., as described in above-referenced U.S. Provisional Application No. 62/005,764, U.S. Provisional Application No. 62/094,391, and U.S. application Ser. No. 14/725,912. As another example, controller 502(2) may be able to locate, via network 508, proxy 510 and send a message to proxy 510 to obtain information about accessories with which proxy 510 can communicate. In some embodiments, controller 502(2) can create a list of potential communication paths prior to receiving the input at block 602, and the previously created list can be accessed at block 604.

At block 606, controller 502(2) can select a communication path from the list of potential communication paths. A number of different selection rules can be used. In some embodiments, path selection can depend on controller preference. For instance, one particular controller (e.g., a mobile phone) may have a preference to use a direct communication path whenever possible, while a different controller (e.g., a wearable device such as a smart watch) may have a preference to use an indirect communication path whenever possible. As another example, the selection between a direct path and an indirect path can depend on whether the controller or the proxy is considered more likely to be able to establish and maintain a connection to accessory 504. For instance, if accessory 504 has limited communication range, a proxy 510 that is installed in physical proximity to accessory 504 may be more reliably able to establish and maintain a connection than a mobile controller device 502(2), even in instance when controller 502(2) is present in local environment 506.

For selection among indirect paths (e.g., when a direct path is not available or when an indirect path is preferred), in some embodiments, selection can be based on device-type information about the potential proxy devices and associated inferences as to which type of proxy device is most likely to have a reliable connection to the accessory. For instance, as described above, proxy 510 can be any device that is present in local environment 506, while devices do not function as proxies when they are outside local environment 506. Accordingly, likelihood that the potential proxy is present in local environment 506 can be a consideration in selecting a proxy to use. By way of illustration, a mobile phone would be very likely to leave local environment 506 if its user leaves, while a desktop computer would be relatively unlikely to leave local environment 506; accordingly, a desktop computer can be preferred as a proxy over a mobile phone. As another example, a desktop computer might be powered down when not in use, while another type of device that normally remains in local environment 506 (such as a dedicated accessory-control base station) might be more likely to be always powered on and therefore reachable. Based on such considerations, a hierarchy of preferred proxy device types can be established (e.g., dedicated base station first, then desktop computer, then other stationary devices, then mobile devices), and selection of a proxy at block 610 can be based on the device type and the hierarchy. Other selection rules, including random selection, can be implemented.

At block 608, process 600 can attempt to make a connection via the selected (direct or indirect) communication path. In the case of a direct communication path, processing at block 608 can include sending a message directly to accessory 504 to establish a communication channel. In the case of an indirect communication path, the connection attempt can include attempting to establish a communication channel between controller 502(2) (on which process 600 can be executing) and selected proxy 510. In some embodiment, locating the selected proxy can be facilitated using a cloud-based data service that has information regarding the location or connectivity of various user devices. In some embodiments, proxy 510 can verify that controller 502(2) is authorized to communicate with it, e.g., by referencing a list of authorized controllers similar to the list at block 604.

If, at block 610, the connection is via an indirect path, then at block 612, process 600 can determine whether a connection to proxy 510 is successfully established. If not, then at block 614, process 600 can determine whether to retry (e.g., using a different communication path or retrying the same path). A decision to retry can return process 600 to block 606 to select another communication path (or retry the same communication path); a decision not to try ends process 600 at block 616. If, at block 612, the connection to proxy 510 has been established, then at block 618, process 600 can determine whether proxy 510 can connect to accessory 504. For example, having established a communication path to proxy 510, controller 502(2) can send a message on that path indicating a request to communicate with accessory 504. In response, proxy 510 can attempt to establish a communication session with accessory 504 (which might or might not be a pair-verified session, depending on the particular proxy 510), and the outcome at block 618 can depend on whether that attempt succeeds. If the connection attempt succeeds, then at block 620, with controller 502(2) connected to proxy 510 and proxy 510 connected to accessory 504, controller 502(2) can communicate with accessory 504 through proxy 510. If the connection attempt at block 618 fails, process 600 can proceed to block 614 to retry or quit.

If, at block 610, the connection is via a direct path, then at block 622, process 600 can determine whether a (direct) connection to accessory 504 is successfully established. If a direct connection is established, then at block 624, controller 502(2) can communicate directly with accessory 504. If a direct connection is not established, then process 600 can proceed to block 614 to retry or quit.

Process 600 allows a controller to support multiple communication paths to the same accessory, and a decision on which path to use can be made on a per-connection basis, depending, e.g., on where the controller is currently located (e.g., within or outside the local environment where the accessories are present) and other policy preferences. Different controllers can implement different preferences, and some controllers can be excluded from using certain communication paths (e.g., a particular controller might be required to use only direct communication paths or to use only indirect communication paths).

Figure 7:
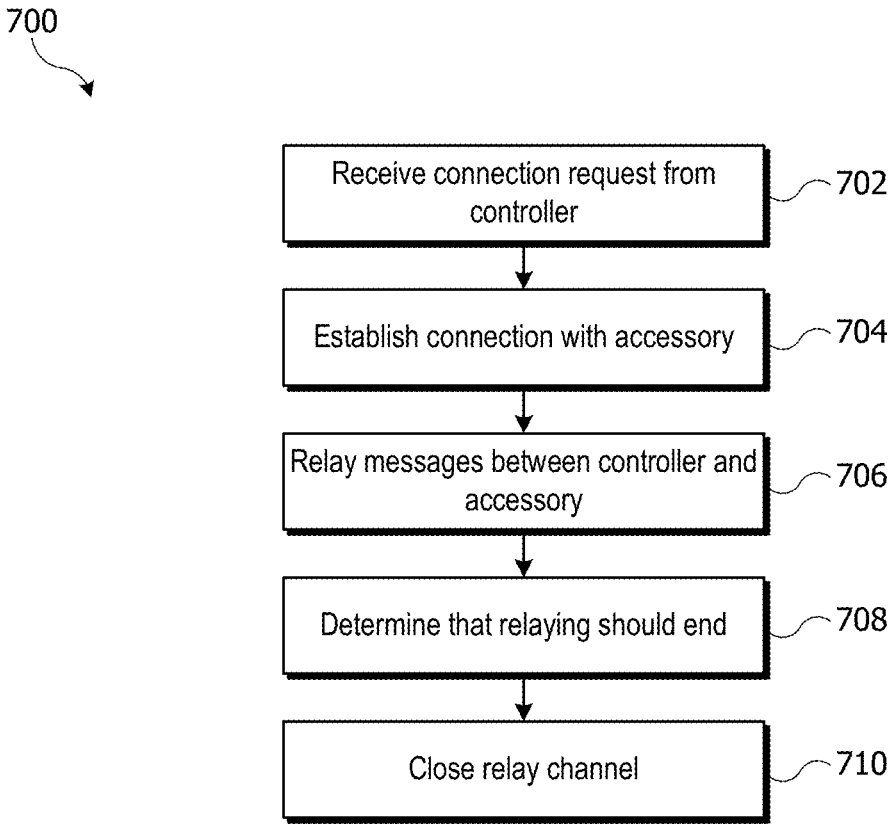
FIG. 7 is a flow diagram of a process for communicating between a controller and an accessory via a proxy according to an embodiment of the present invention.

FIG. 7 is a flow diagram of a process 700 for communicating between a controller and an accessory via a proxy according to an embodiment of the present invention. Process 700 can be implemented, e.g., in proxy 510 of FIG. 5.

At block 702, proxy 510 can receive a request from a controller (e.g., controller 502(2) of FIG. 5) to connect to an accessory (e.g., accessory 504). This can correspond to block 612 or 620 of process 600. In response, at block 704, proxy 510 can connect to accessory 504. For example, proxy 510 can establish a pair-verified session (e.g., as described above) with accessory 504. In some embodiments, communication between proxy 510 and accessory 504 can use a protocol other than the uniform accessory protocol. Proxy 510 can establish the connection to accessory 504 using any protocol that accessory 504 does support, and such protocols might or might not include securing the channel between proxy 510 and accessory 504. If proxy 510 is unable to establish the session, proxy 510 can so inform controller 502(2) (e.g., at block 620 of process 600). Additional examples of establishing connections are described below with reference to "bridge" and "tunnel" proxies.

At block 706, assuming the pair-verified session is established, proxy 510 can relay messages between controller 502(2) and accessory 504. Proxy 510 can be agnostic to message content of the messages it relays. For example, proxy 510 can simply pass along messages as received in either direction. These messages can be exactly the same as what would be exchanged if controller 502(2) were in local environment 506 and communicating directly with accessory 504. For example, controller 502(2) can first establish a pair-verified session with accessory 504 (independently of the session between proxy 510 and accessory 504) and can thereafter send encrypted control messages to accessory 504 and receive encrypted responses from accessory 504 using the session key for controller 502(2). Proxy 510 need not be able to read these messages, as long as proxy 510 can route them to their destinations.

In some embodiments, proxy 510 can encrypt messages to accessory 504 using its own pair-verified session key. Where this is the case, accessory 504 can remove the encryption added by proxy 510 to extract the original message from controller 502(2), then decrypt the message, e.g., using a different session key associated with controller 502(2). Similarly, accessory 504 can encrypt responses using the session key associated with controller 502(2), then send the response within a message to proxy 510 that is encrypted using the session key associated with proxy 510; where this is the case, proxy 510 can decrypt the message and forward the still-encrypted response to controller 502(2). Thus, a pair-verified session between controller 502(2) and accessory 504 can provide end-to-end encryption and security against interception of communications, regardless of the particular communication path.

In some embodiments, proxy 510 and controller 502(2) can also establish a secure (e.g., encrypted) communication channel independently of all other encryption schemes and keys. Where this is the case, proxy 510 can perform decryption and re-encryption on inbound and outbound messages using the appropriate keys. This layer of encryption, if used, would be on top of the pair-verified encryption performed by the endpoints (controller 502(2) and accessory 504) so the communication between the endpoints can remain secure against being read by proxy 510.

Any number of messages can be relayed in either or both directions at block 706. At block 708, proxy 510 can determine that the relaying of messages should end. For example, proxy 510 can receive a session-end message from either accessory 504 or controller 502(2). Such a message can be generated when either accessory 504 or controller 502(2) decides to end a communication session with proxy 510. As another example, the connection between proxy 510 and controller 502(2) or the connection between proxy 510 and accessory 504 can timeout. At block 710, proxy 510 can close the relay channel (i.e., stop relaying messages between the devices). In some embodiments, proxy 510 can send a message to either or both of accessory 504 and controller 502(2) to indicate that the relay channel has been closed.

It will be appreciated that the network configuration and processes of FIGS. 5-7 are illustrative and that variations and modifications are possible. Process steps described as sequential may be executed in parallel, order of steps may be varied, and steps may be modified, combined, added or omitted. Controllers can access an accessory directly at some times (e.g., while they are within local environment 506) and through a proxy at other times. Assuming a proxy connected to the Internet (or other worldwide network) is available, a controller can be used to control an accessory from anywhere in the world. Use of proxies in this manner can provide the convenience of controlling an accessory from anywhere without requiring the accessory to be connected to a wide area network. This can help security by limiting access to the accessory. Further, to the extent that the proxy implements its own security (e.g., providing a relay only for controllers that are on a list of authorized controllers for the accessory), this extra layer of security can provide additional protection against tampering with accessories, on top of the security provided by pair-verification between the accessory and controller.

A proxy can be any device that is present in the local environment when communication through a proxy is requested, that can present itself as a controller to the accessory to be controlled (e.g., to establish a pair-verified session), and that is capable (e.g., through execution of appropriate program code) of relaying information between an accessory and another controller. The proxy can but need not have its own user interface to allow a user to interact directly with it; in some instances, all interaction with a proxy can be through another controller. In some embodiments, an accessory can require that all access to the accessory occur via a proxy. In some instances, a connection to an accessory can be made via multiple proxies. For instance, a controller can connect with a first proxy, and the first proxy can identify a second proxy that has a communication path to an accessory.

Example Bridge and Tunnel Proxies

In some embodiments, a proxy can operate as a bridge or a tunnel to facilitate communication between a controller and one or more accessories regardless of whether the controller is present in or absent from the local environment. For example, an accessory installed in a home (e.g., a door lock) may be configured to communicate using a short-range wireless communication protocol such as Bluetooth LE, ZigBee, or the like, and controllers can go out of communication range of the accessory while still being present in the home. A bridge or tunnel can be placed within communication range of the accessory and can support the protocol used by the accessory as well as a longer-range wireless communication protocol such as Wi-Fi. Further, it is not necessary that the controller support the protocol used by the accessory; a bridge or tunnel can perform protocol translation. Accordingly, a controller can communicate with the accessory as long as the controller is in range of the bridge or tunnel. In some cases, the bridge or tunnel can also be capable of communicating via a wide-area network (e.g., the Internet) and thus can also act as a proxy for communications between accessories in the local environment and controllers located outside the local environment as described above. As used herein, the distinction between a "bridge" and a "tunnel" is that a tunnel can provide end-to-end security between the controller and the accessory (e.g., allowing the controller and accessory to establish a pair-verified session with each other through the tunnel), while a bridge provides security (e.g., a pair-verified session) between the controller and the bridge but not necessarily between the bridge and the accessory.

Figure 8:
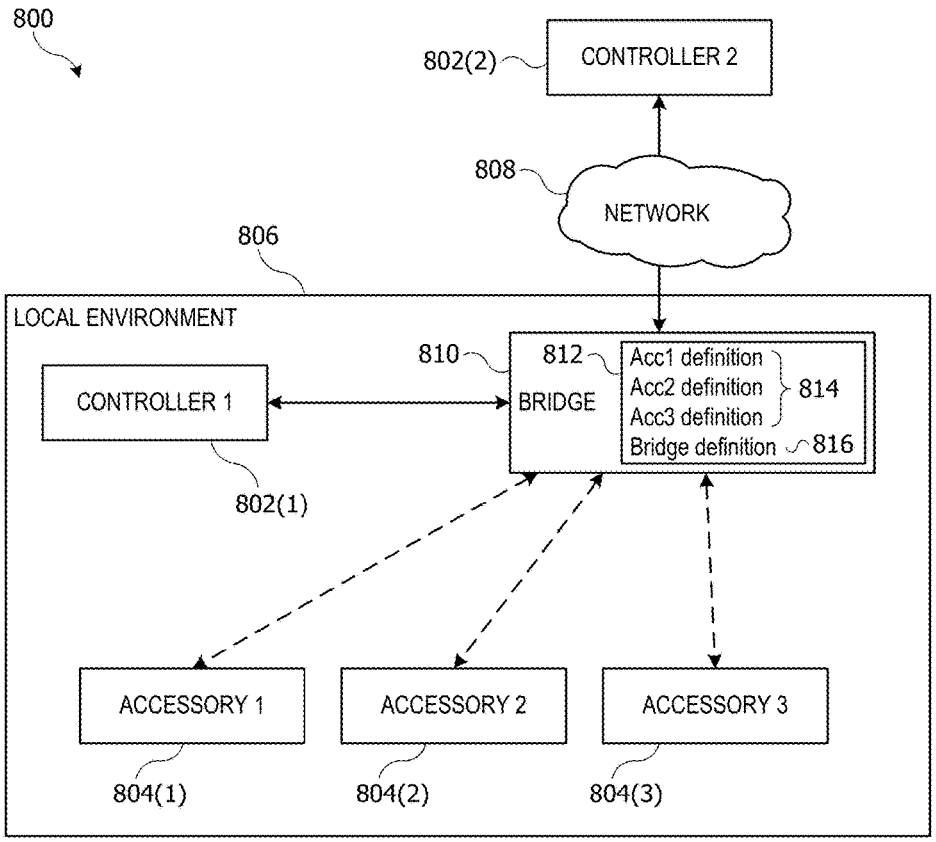
FIG. 8 shows a controller network configuration with a bridge according to an embodiment of the present invention.

In some embodiments, a bridge can facilitate communication with one or more accessories that might not support the uniform accessory protocol. For example, some manufacturers may make a "hub" device that can control a collection of other devices (referred to herein as "endpoints" or "endpoint accessories"), such as a collection of light bulbs that can be individually controlled to change color, brightness, etc. The manufacturer may have defined a device-specific protocol to enable communication between the hub device and the endpoints. It may nevertheless be desirable to enable the endpoint accessories to be controlled using controllers and a uniform accessory protocol. Accordingly, in some embodiments, the hub device can be configured to function as a bridge between the controller and the endpoint accessories. An example is shown in FIG. 8, which shows a network configuration 800 according to an embodiment of the present invention. Configuration 800 allows controllers to communicate with one or more accessories via a proxy that functions as a bridge. Controllers 802(1) and 802(2) can be similar to controllers 202 of FIG. 2, and endpoint accessories 804(1)-804(3) can be similar to accessory 204 of FIG. 2. In this example, controller 802(1) is currently located in a local environment 806 with accessories 804; controller 802(1) is said to be "local" to accessories 804. Controller 802(2) is an example of a "remote" controller that is currently located outside local environment 806 but is connected to a communication network 808 (e.g., the Internet or another wide-area network).

Also present in local environment 806 is a bridge device (or "bridge") 810, which can be similar to proxy device 510 described above. Bridge 810 in this example is also connected to communication network 808; however, for purposes of communication with local controller 802(1), a connection to network 808 is not required. Bridge 810, like proxy 510, can act as a relay between remote controller 802(2) and accessory 504. Bridge 810 can also act as a relay between local controller 802(1) and accessory 104. For example, controller 802(1) can be in local environment 806 but outside the communication range of accessory 804(1); in that case, controller 802(1) may still be within range of bridge 810, and controller 802(1) can communicate with accessory 804(1) by sending messages to bridge 810. This can be similar to operations of proxy 510 described above.

As another example, accessory 804(1) and controller 802(1) might not support the same wireless communication protocol. For example, accessory 804(1) might support only ZigBee, while controller 802(1) does not support ZigBee. In this case, bridge 810 can function as a protocol translator to enable communication between accessory 804(1) and controller 802(1).

By way of illustration, controller 802(1) can support a uniform accessory protocol in which each accessory is modeled as a collection of services, with each service being defined as a set of characteristics, each of which has a defined value at any given time, e.g., as described in above-referenced U.S. Provisional Application No. 61/935,967 and U.S. application Ser. No. 14/614,914. An accessory can describe itself to a controller by providing to the controller an accessory definition record, which can be a structured data object that defines the services and characteristics of the accessory. The structured data object can be represented in various formats depending on the particular communication channel or transport. For instance, JSON (JavaScript Object Notation) can be used where controllers and accessories communicate via Wi-Fi or other protocols based on the IP (Internet Protocol) stack; for controllers and accessories communicating via Bluetooth LE, the Bluetooth LE Generic Attribute Profile (GATT) can be used. The uniform accessory protocol can specify data-object formats for use with various transports.

Accordingly, bridge 810 can construct an accessory database 812 that includes an accessory definition record 814(1)-814(3) corresponding to each endpoint accessory 804(1)-804(3) as well as an accessory definition record 816 for the bridge itself. Accessory database 812 can include structured data objects formatted according to the specifications of the uniform accessory protocol.

In some embodiments, bridge 810 can construct accessory database 812 by communicating with each endpoint accessory 804(1)-804(3) according to whatever protocol is supported by endpoint accessories 804(1)-804(3) to obtain information about the accessory's capabilities and current operational status. Bridge 810 can apply mapping logic to generate a structured data object representing this information. In some embodiments, bridge 810 can be configured for a specific class of accessories (e.g., light bulbs), and this can simplify the mapping logic. Bridge definition record 816 can represent the bridge itself as an accessory, and its presence can be an indicator to controllers 802 that they are communicating with a bridge.

In operation, bridge 810 can appear to controllers 802 as an accessory conforming to the uniform accessory protocol. For example, according to the protocol, bridge 810 can advertise itself (or broadcast its presence) on a network as a bridge, e.g., based on bridge accessory definition record 816. Controller 802(1) (or controller 802(2)) can establish a pairing with bridge 810 and thereafter connect to bridge 810 as it would any other type of accessory, e.g., establishing a pair-verified session. Upon connection, controller 802(1) can request and receive accessory database 812 (or portions thereof) from bridge 810. In this manner, controller 802(1) can determine the state of accessories 804. When responding to read requests to determine the state of accessories 804, bridge 810 can query the accessories in real time, or bridge 810 can periodically poll the accessories and update the status. In some embodiments, the only way to control accessories 804 may be via bridge 810, and in that case bridge 810 may simply maintain the state information in accessory database 812.

In addition to reading accessory information, including current state (represented by values of characteristics in accessory database 812), controller 802(1) (or controller 802(2)) can also change the state of an accessory, e.g., accessory 804(1) by sending a write request conforming to the uniform accessory protocol to bridge 810, to write new values to one or more characteristics. Bridge 810 can translate the write request into the protocol used by accessory 804(1) and send a corresponding instruction that accessory 804(1) can process. Bridge 810 can also generate a response to the write request (e.g., based on any responsive signals received from accessory 804(1)) in a format that conforms to the uniform accessory protocol and send the response to controller 802(1).

It should be noted that communication with endpoint accessories 804(1)-804(3) via bridge 810 might or might not be secure; this is indicated in FIG. 8 by the dashed arrows connecting bridge 810 and accessories 804. For example, as described above, communication between controller 802(1) or 802(2) and bridge 810 can conform to the uniform accessory protocol, which can provide end-to-end security as described above. However, communication between bridge 810 and endpoint accessories 804(1)-804(3) might or might not be secure, depending on the specific protocol(s) being used. Accordingly, when bridge 810 identifies itself to controllers 802 as a bridge, controllers 802 can assume that the channel between bridge 810 and accessories 804 is not secure and can act accordingly. In some embodiments, bridge 810 may be subject to restrictions on operation; for instance, controller 802(2) may not be permitted to access a bridge while it remains outside local environment 806, or certain operations through bridge 810 may be disabled for controller 802(2) while it is not in local environment 806.

In addition to the bridge functions described above (e.g., translating between different protocols), it may be desirable to provide end-to-end security conforming to the uniform accessory protocol. In some embodiments, a "tunnel" can be similar to a bridge in many respects, but with the addition of end-to-end security between the controller and the endpoint accessory. Tunnels can be used, for example where the controller and the accessory both support the uniform accessory protocol but are using different transports.

Figure 9:
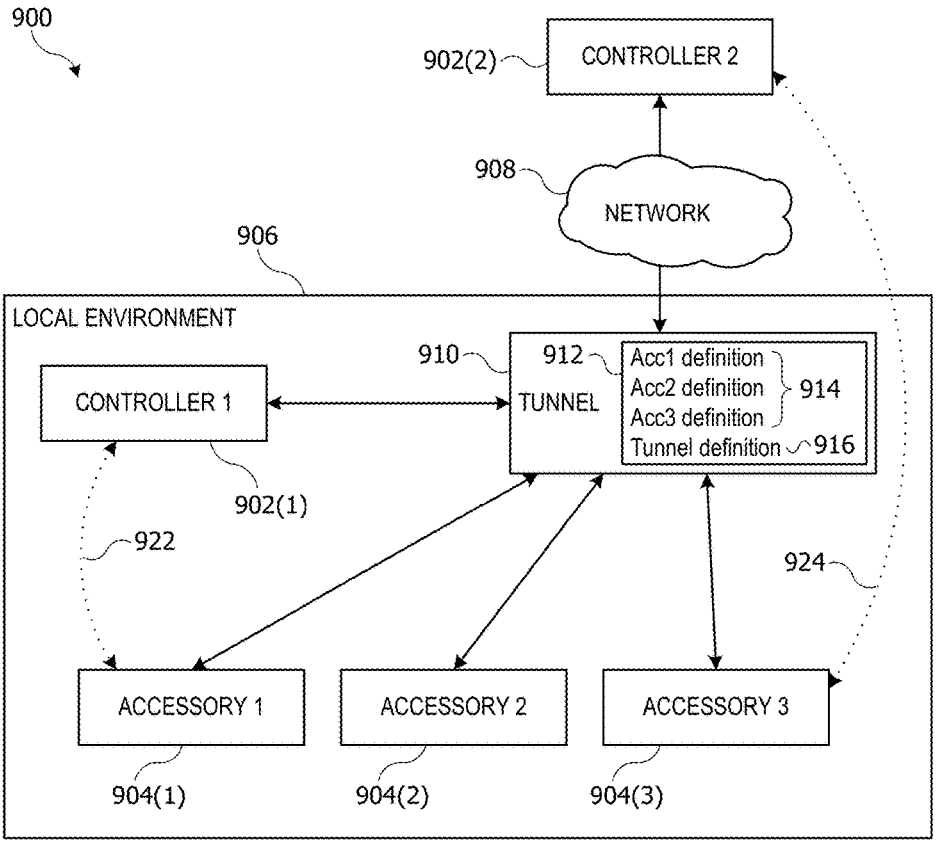
FIG. 9 shows a controller network configuration with a tunnel according to an embodiment of the present invention.

FIG. 9 shows a network configuration 900 according to an embodiment of the present invention. Configuration 900 allows controllers to communicate with one or more endpoint accessories via a proxy that functions as a tunnel. Controllers 902(1) and 902(2) can be similar to controllers 202 of FIG. 2, and endpoint accessories 904(1)-904(3) can be similar to accessory 204 of FIG. 2. In this example, controller 902(1) is currently located in a local environment 906 with accessories 904; controller 902(1) is said to be "local" to accessories 904. Controller 902(2) is an example of a "remote" controller that is currently located outside local environment 906 but is connected to a communication network 908 (e.g., the Internet or another wide-area network).

Also present in local environment 906 is a tunnel device (or "tunnel") 910, which can be similar to proxy device 510 or bridge device 810 described above. Tunnel 910 in this example is also connected to communication network 908; however, for purposes of communication with local controller 902(1), this is not required. Tunnel 910, like proxy 510, can act as a relay between remote controller 902(2) and accessory 504. Tunnel 910 can also act as a relay between local controller 902(1) and accessory 104. For example, controller 902(1) can be in local environment 906 but outside the communication range of accessory 904(1); in that case, controller 902(1) may still be within range of tunnel 910, and controller 902(1) can communicate with accessory 904(1) by sending messages to tunnel 910. This can be similar to operations of proxy 510 described above.

For purposes of description of tunnel operations, it is assumed that a uniform accessory protocol has been defined for at least an IP transport (e.g., Wi-Fi or other wireless transport based on the Internet Protocol stack) and a Bluetooth LE ("BLE") transport. The IP transport is assumed to have a longer range (e.g., a typical home Wi-Fi network may be accessible from anywhere in the home while the range of Bluetooth LE communication is generally shorter), while the BLE transport may have advantages in terms of reducing power consumption or the like. A given controller or accessory can be configured to support the uniform accessory protocol on either or both transports; it is assumed for present purposes that controllers 902 support the uniform accessory protocol on both the IP and BLE transports while accessories 904 only support the uniform accessory protocol on the BLE transport. Other transports and combinations of transports can be substituted.

Similarly to bridge 810, tunnel 910 can construct an accessory database 912 that includes an accessory definition record 914 corresponding to each endpoint accessory 904 (1)-904(3) as well as an accessory definition record 916 for the tunnel itself. Accessory database 912 can include structured data objects formatted according to the specifications of the uniform accessory protocol. In some embodiments, accessory database 912 can define a mapping between the representation of a particular information item used for the IP transport and the representation of a particular item used for the BLE transport. For instance, in some embodiments, an accessory definition record for accessory 904(1) according to the IP transport can assign an accessory identifier ("AID") to the accessory and a unique "instance" identifier ("IID") to each characteristic of the accessory. These can be sequential numerical identifiers (e.g., starting at 1) or the like. In parallel, an accessory definition record for accessory 904(1) according to the BLE transport can be implemented as a GATT database and can assign a unique "attribute handle" to each characteristic. Tunnel 910 can construct database 912, e.g., by communicating with each endpoint accessory 904 using the BLE transport to obtain an accessory definition record (e.g., a GATT database conforming to Bluetooth LE) that includes the attribute handle and other definitional information for each characteristic. Based on the received accessory definition record, tunnel 910 can construct and store (e.g., in accessory database 912) a mapping between the attribute handle of each characteristic provided by the accessory and a corresponding (AID, IID) assigned by tunnel 910. Each accessory definition record 914 can also include an instance of a "tunnel" service defined by tunnel 910. The characteristics of the tunnel service can include information items obtained by tunnel 910 from the corresponding accessory 904 via advertisements by accessory 904 on the BLE transport (e.g., an accessory identifier that can be recognized by controllers, a state counter value as described below, current connection status of the accessory, etc.). In some embodiments, tunnel 910 does not receive or store the value of any accessory characteristics (other than advertised characteristics), which can prevent interlopers from determining the status of accessories 104 by reading accessory database 912. Tunnel definition record 916 can represent the tunnel itself as an accessory, and its presence can be an indicator to controllers 902 that they are communicating with a tunnel. This may affect how controllers 902 format messages and certain other aspects of operation; examples are described below.

In some embodiments, prior to communicating with accessories 904 via tunnel 910, controllers 902 may first communicate directly with accessories 904 using the BLE transport to establish a pairing (e.g., using a pair setup or pair add process as described above). In other embodiments, a controller 902 can establish a pairing with an accessory 904 via tunnel 910. It should be noted that where controller 902 establishes a pairing with one of accessories 904 by direct communication, this can help provide some assurance to controller 902 that accessory 904 does in fact support the uniform accessory protocol on the BLE transport, such that end-to-end security of communications to the accessory can be expected. (If the pairing is established through tunnel 910, it may be possible for tunnel 910 to "fake" the expected accessory responses, which may not be desirable.) When controller 902 subsequently connects to accessory 904 via tunnel 910, controller 902 can establish a pair-verified session with accessory 904 (as indicated by dotted lines 920, 922), securing the content of communications against eavesdropping by tunnel 910. In addition, prior to communicating with accessories 904 via tunnel 910, controller 902 may be required to establish a pairing with tunnel 910, so that all subsequent communication between controllers 902 and tunnel 910 can be secured within a pair-verified session.

Figure 10:
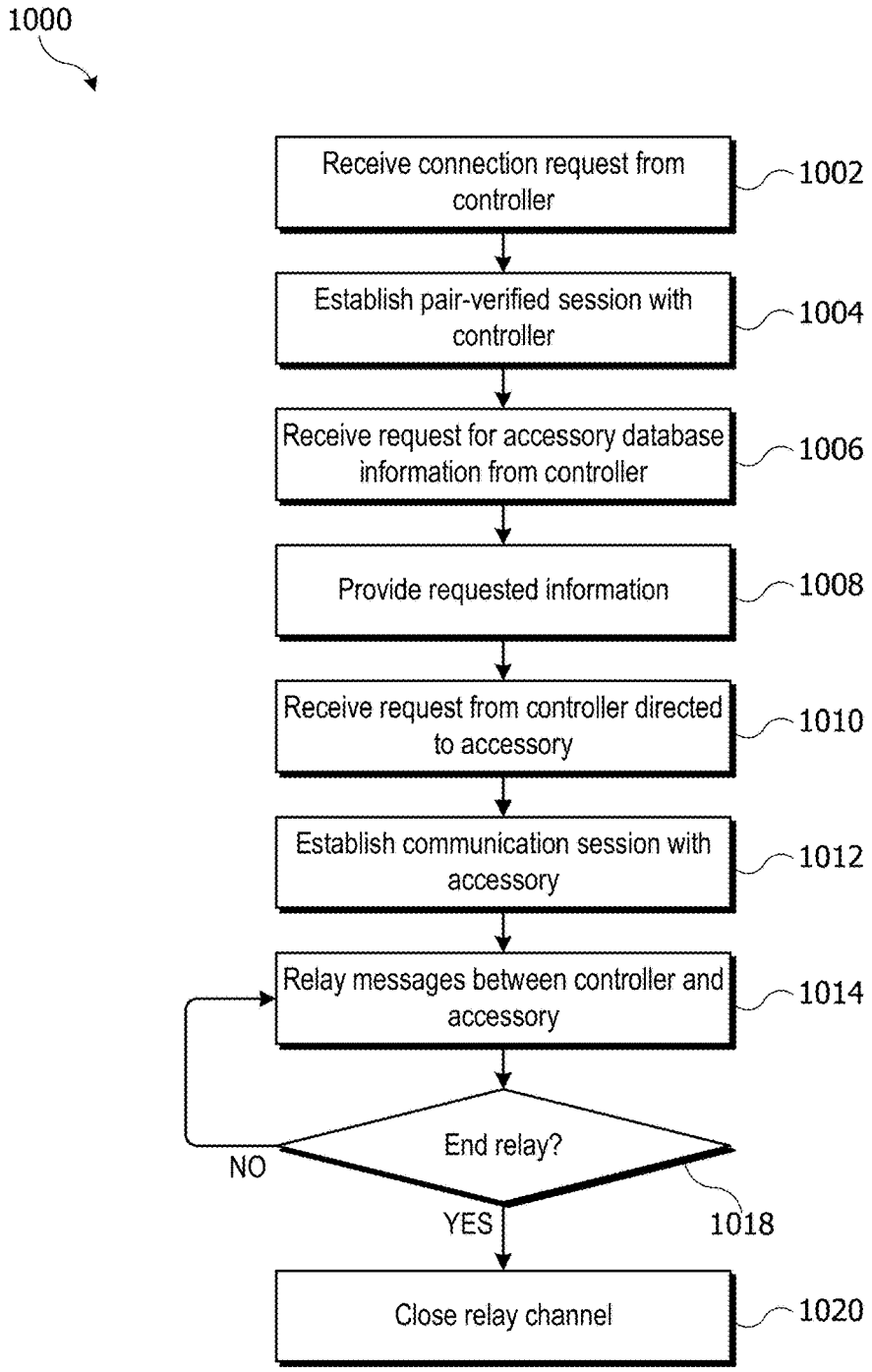
FIG. 10 is a flow diagram of a process for communication between a controller and an accessory via a tunnel according to an embodiment of the present invention.

FIG. 10 is a flow diagram of a process 1000 for communication between a controller, e.g., controller 902(1) of FIG. 9, and an accessory, e.g., accessory 904(1) of FIG. 9, via a tunnel, e.g., tunnel 910, according to an embodiment of the present invention. Process 1000 can be implemented, e.g., in tunnel 910 of FIG. 9. It is assumed that tunnel 910 has already communicated with one or more endpoint accessories (e.g., accessories 904 of FIG. 9) using the BLE transport and has constructed accessory database 912. In some embodiments, tunnel 910 can also establish a pairing with each accessory 904 according to the uniform accessory protocol prior to executing process 1000. It is further assumed that tunnel 910 has established a pairing with at least one controller (e.g., controller 902(1) or 902(2) of FIG. 9) according to the uniform accessory protocol.

At block 1002, tunnel 910 can receive a connection request from a paired controller 902(1) (or controller 902 (2)). For example, controller 902 can detect the presence of tunnel 910 on an IP network such as a Wi-Fi network, where tunnel 910 can broadcast its presence as an accessory that operates as a tunnel. At block 1004, tunnel 910 can establish0 a pair-verified session (e.g., as described above) with the requesting controller 902(1). At block 1006, within the pair-verified session, tunnel 910 can receive a request from controller 902(1) to read some or all of the information in accessory database 912. At block 1008, tunnel 910 can provide the requested information to controller 902(1). Blocks 1006 and 1008 can be repeated to allow any or all of the information in accessory database 912 to be read. As noted above, in some embodiments, the information in accessory database 912 includes identifiers and/or descriptors of characteristics representing the current state of the various accessories but does not include the current values of such characteristics. In some embodiments, controller 902(1) can proceed without reading information from accessory database 912 (e.g., by using information obtained in previous communication sessions), and blocks 1006 and 1008 can be omitted.

At block 1010, tunnel 910 can receive a request from controller 902(1) directed to an endpoint accessory (e.g., accessory 904(1)). In some embodiments, the request can be a request to read or write any characteristic of any service of accessory 904(1). For example, in some embodiments, every accessory conforming to the uniform accessory protocol has a pairing service, and controller 902(1) can send requests to the pairing service to perform a pair verify operation with accessory 904(1). At block 1012, tunnel 910 can establish a communication session with accessory 904(1). In some embodiments, the communication session can use a protocol other than the uniform accessory protocol. For example, tunnel 910 can perform Bluetooth LE bonding with accessory 904(1), and the communication session can use a channel secured according to Bluetooth LE specifications. Other protocols can also be used. In some embodiments, the communication session between tunnel 910 and accessory 904(1) can be a pair-verified session according to the uniform accessory protocol; the protocol can allow accessory 904(1) to distinguish a tunnel from a controller, and tunnels can be permitted to relay messages from controllers but not to initiate control messages on their own. Other implementations are also possible, and the channel between tunnel 910 and accessory 904(1) need not be secured at all.

At block 1014, tunnel 910 can begin relaying messages between controller 902(1) and accessory 904(1). The messages can be relayed in a manner that provides end-to-end security between controller 902(1) and accessory 904(1) regardless of what (if any) security is used on the channel between tunnel 910 and accessory 904(1).

Figure 11:
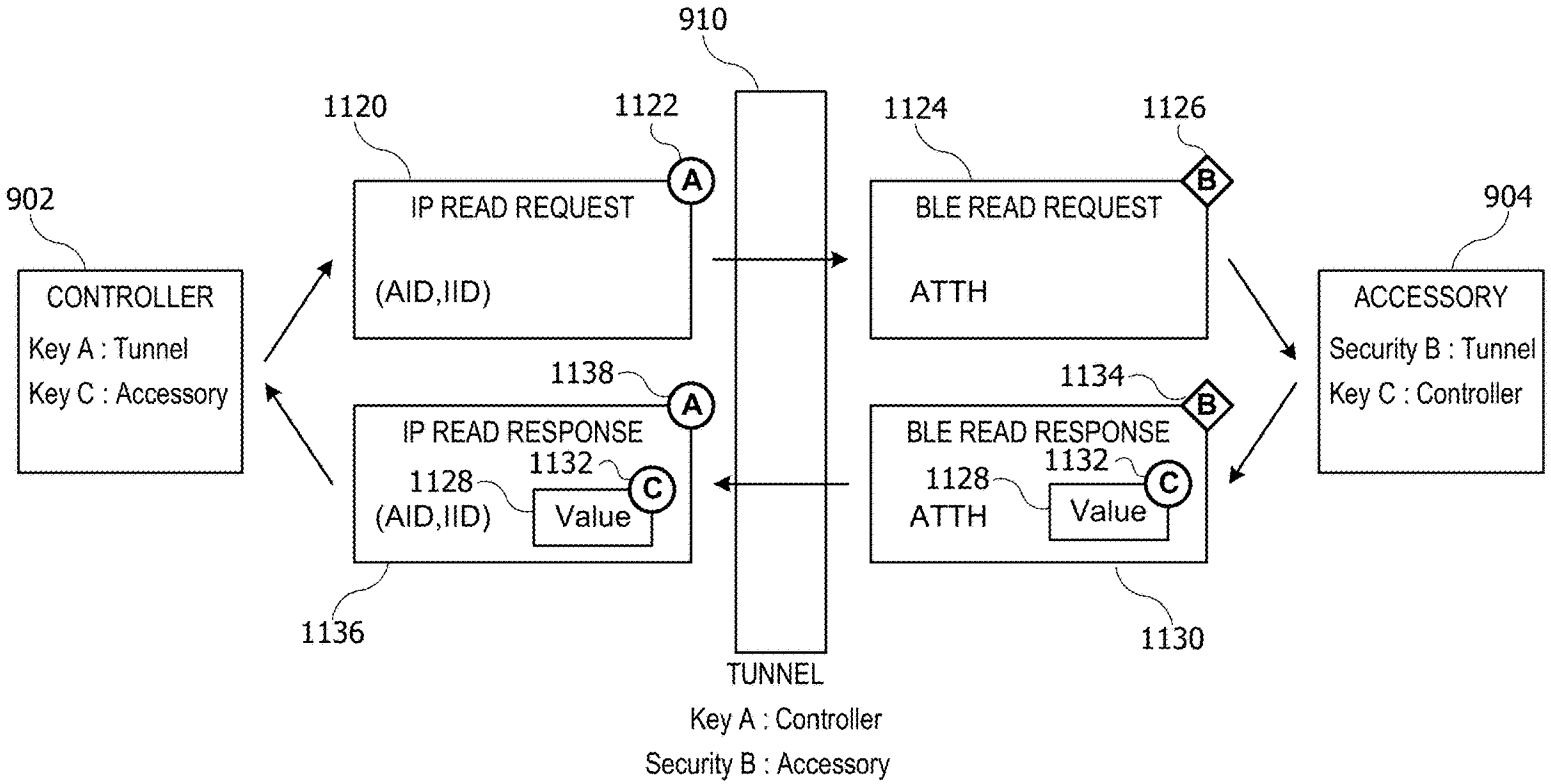
FIG. 11 illustrates communication of a read request via a tunnel according to an embodiment of the present invention.

Relaying of messages according to one embodiment is further illustrated in FIGS. 11 (for read requests) and 12 (for write requests). In these examples, it is assumed that a pair-verified session has been established between controller 902 (which can be any of controllers 902(1) or 902(2) of FIG. 9) and tunnel 910, e.g., at block 1004 of process 1000. Accordingly, session key "A" has been established as a shared secret between controller 902 and tunnel 910; key A can persist for the duration of the pair-verified session between controller 902 and tunnel 910 and can be used to encrypt communications between controller 902 and tunnel 910. It is also assumed that a communication session has been established between tunnel 910 and accessory 904 (which can be any of accessories 902(1)-902(3) of FIG. 9), e.g., at block 1006 of process 1000. The session between tunnel 910 and accessory 904 can be secured using a security measure "B" (which can be, e.g., a session key or other shared secret associated with securing the channel between tunnel 910 and accessory 904). In some embodiments, the channel between tunnel 910 and accessory 904 can be unsecured, and security measure B is not required.

Communications exchanged between controller 902 and accessory 904 via tunnel 910 can include requests from controller 902 related to establishing a pair-verified session between controller 902 and accessory 904, as a result of which session key "C" can be established as a shared secret between controller 902 and accessory 904. Key C can persist for the duration of the pair-verified session between controller 902 and tunnel 910 and can be used to encrypt communication between controller 902 and accessory 904. It should be noted that tunnel 910 does not share key C and therefore cannot read any information encrypted using key C.

In some embodiments, having established session keys A and C (and security measure B if desired), messages can be sent between controller 902 and accessory 904 in a manner such that tunnel 910 can convert uniform accessory protocol messages between IP and BLE transports without becoming privy to information about the state of the accessory (e.g., values of specific characteristics). FIG. 11 illustrates communication of a read request via tunnel 910 according to an embodiment of the present invention. As shown, controller 902 can IP read request 1120, conforming to the uniform accessory protocol as implemented for the IP transport. For example, IP read request 1120 can specify the accessory identifier (AID) and instance identifier (IID) of a particular characteristic to be read. Controller 902 can determine the (AID, IID) for the request based on information read from accessory information database 912, e.g., at blocks 1006 and 1008 of process 1000. Controller 902 can encrypt IP read request 1120 using key A, as indicated by circle 1122. IP read request 1120 can be an example of a "request message" that can be sent from a controller to a proxy to request an interaction with the accessory (in this case reading a value of an accessory characteristic to determine an aspect of accessory state).

Tunnel 910 has key A and can decrypt IP read request 1120. Tunnel 910 can translate decrypted read request 1120 to BLE read request 1124 conforming to the uniform accessory protocol as implemented for the BLE transport. For example, as shown, the (AID, IID) of read request 1120 can be replaced with the corresponding attribute handle ("ATTH") based on information in accessory database 912. Tunnel 910 can send BLE read request 1124 to accessory 904 using security measure B, as indicated by diamond 1126. BLE read request 1124 can be an example of an "instruction message" that can be sent from a proxy to an accessory to perform an interaction with the accessory in response to a request from a controller (in this case reading a value of an accessory characteristic to determine an aspect of accessory state).

Accessory 904 has security measure B and can read BLE read request 1124. Accessory 904 can generate a response to BLE read request 1124. For example, accessory 904 can determine the state of the characteristic corresponding to the attribute handle ATTH included in BLE read request 1124 and generate a corresponding value. Accessory 904 can encrypt the value using key C and include the encrypted value 1128 in a BLE read response 1130; the encryption of value 1128 is indicated by circle 1132. Accessory 904 can send BLE read response 1130 to tunnel 910 using security measure B, as indicated by diamond 1134. BLE read response 1130 can be an example of an "instruction-response message" that can be sent from an accessory to a proxy in response to an instruction message received from the proxy.

Tunnel 910 has security measure B and can read BLE read response 1130. Tunnel 910 does not have key C and therefore cannot decrypt value 1128. Instead, tunnel 910 can translate decrypted BLE read response 1130 to an IP read response 1136 conforming to the uniform accessory protocol as implemented for the IP transport. For example, as shown, the attribute handle ATTH of BLE read response 1130 can be replaced with the corresponding (AID, IID) based on information in accessory database 912. Value 1128, still encrypted using key C, is included as-received in IP read response 1136. IP read response 1136 is encrypted using key A, as indicated by circle 1138. IP read response 1136 can be an example of a "response message" that can be sent from a proxy to a controller in response to a request message from the controller; the response message can be based on an instruction-response message received by the proxy from the accessory.

Controller 902 has key A and can decrypt IP read response 1136. Controller 904 also has key C and can decrypt value 1128, thereby obtaining the requested information. In this manner, tunnel 910 can relay read requests between controller 902 and accessory 904 without becoming privy to the status of characteristics being read.

Figure 12:
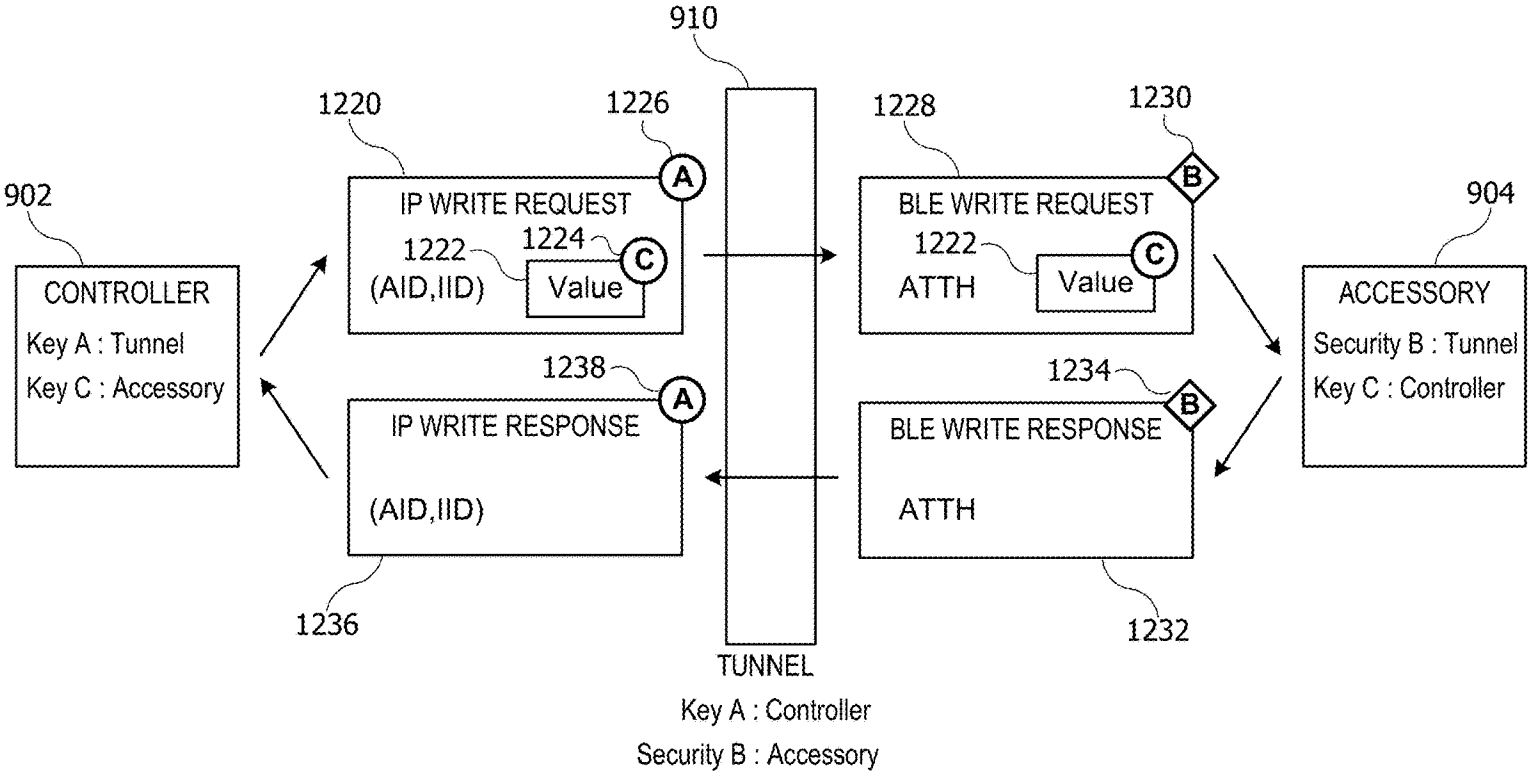
FIG. 12 illustrates communication of a write request via a tunnel according to an embodiment of the present invention.

A similar technique can be used for write requests. FIG. 12 illustrates communication of a write request via tunnel 910 according to an embodiment of the present invention. As shown, controller 902 can generate an IP write request 1220 conforming to the uniform accessory protocol as implemented for the IP transport. For example, IP write request 1220 can specify the accessory identifier (AID) and instance identifier (IID) of a particular characteristic to be written. Controller 902 can determine the (AID, IID) for the request based on information read from accessory information database 912, e.g., at blocks 1006 and 1008 of process 1000. IP write request 1220 can also specify a value 1222 to be written to the characteristic. Controller 902 can encrypt value 1222 using key C, as indicated by circle 1224, and can include encrypted value 1222 in IP write request 1220. Controller 902 can encrypt IP write request 1220 using key A, as shown by circle 1226. IP write request 1220 can be another example of a request message that can be sent from a controller to a proxy to request an interaction with the accessory (in this case writing a value to an accessory characteristic to change an aspect of accessory state).

Tunnel 910 has key A and can decrypt IP write request 1220. Tunnel 910 does not have key C and therefore cannot decrypt value 1222. Instead, tunnel 910 can translate decrypted IP write request 1220 to a BLE write request 1228 conforming to the uniform accessory protocol as implemented for the BLE transport. For example, as shown, the (AID, IID) of IP write request 1220 can be replaced with the corresponding attribute handle (ATTH) based on information in accessory database 912. Value 1222, still encrypted using key C, is included as-received in BLE write request 1228. Tunnel 910 can send BLE write request 1228 to accessory 904 using security measure B, as indicated by diamond 1230. BLE write request 1128 can be another example of an instruction message that can be sent from a proxy to an accessory to perform an interaction with the accessory in response to a request from a controller (in this case writing a value to an accessory characteristic to change an aspect of accessory state).

Accessory 904 has security measure B and can read BLE write request 1228. Accessory 904 also has key C and can decrypt value 1222. Accessory 904 can then interpret the write request and take appropriate action (e.g., changing the state of the specified characteristic, such as turning on a light bulb). Accessory 904 can generate a BLE write response 1232, which can indicate whether the request succeeded and, in the case of failure, an error code or the like. Accessory 904 can send BLE write response 1232 to tunnel 910 using security measure B, as indicated by diamond 1234. BLE write response 1232 can be another example of an instruction-response message that can be sent from an accessory to a proxy in response to an instruction message received from the proxy.

Tunnel 910 has security measure B and can decrypt BLE write response 1232. Tunnel 910 can translate decrypted BLE write response 1232 to an IP write response 1236 conforming to the uniform accessory protocol as implemented for the IP transport. For example, as shown, the attribute handle ATTH of BLE write response 1232 can be replaced with the corresponding (AID, IID) based on information in accessory database 912. In addition, if BLE write response 1232 includes a status code specific to the BLE transport, tunnel 910 can translate the status code to a (potentially different) status code specific to the IP transport. In some embodiments, the same status codes are used independently of transport and accessory 904 can encrypt the status code using key C, so that tunnel 910 is not privy to whether a particular write request succeeded or failed. IP write response 1236 is encrypted using key A, as indicted by circle 1238. IP write response 1236 can be another example of a response message that can be sent from a proxy to a controller in response to a request message from the controller; the response message can be based on an instruction-response message received by the proxy from the accessory.

Controller 902 has key A and can decrypt IP write response 1236, thereby determining whether the write request succeeded or failed.

In this manner, tunnel 910 can relay read and write requests between controller 902 and accessory 904 without becoming privy to the status of characteristics being read and written. It should also be noted that in some embodiments, applying security measure B to messages between tunnel 910 and accessory 904 can be optional. The inherent security features of Bluetooth LE as a transport, combined with the encryption of characteristic values using an end-to-end session key known only to the controller and the endpoint accessory (e.g., key C in FIGS. 11 and 12), may provide sufficient security for some applications.

Referring again to FIG. 10, relaying of messages at block 1014 can continue as long as desired, until at block 1018, tunnel 910 determines that relaying should end. Various conditions can result in determining that relaying should end. For example, there may be a limit imposed on the duration of a session by the transport layer or the uniform accessory protocol (e.g., session keys may expire after a certain amount of time), and relaying can end if this time limit is reached for either the controller-tunnel session or the controller-accessory session. As another example, a relay session may end if no activity occurs during some timeout period or if tunnel 910 loses connectivity to either controller 902 or accessory 904. As yet another example, either controller 902 or accessory 904 can signal to tunnel 910 that a relay session should end.

At block 1020, tunnel 910 can close the relay channel. Closing the relay channel can include, e.g., notifying controller 902 and/or accessory 904 that the channel is now closed, destroying or invalidating the copies of session keys held by tunnel 910 (e.g., keys A and B in FIGS. 11 and 12), or other operations as desired. Thereafter, process 1000 can end; process 1000 can restart whenever another connection request is received from a controller.

In some embodiments, tunnel 910 can also facilitate notifications to controllers 902 when the state of one of endpoint accessories 904 changes. These notifications can conform to a uniform accessory protocol. For instance, as described in above-referenced U.S. Provisional Application No. 61/935,967 and U.S. application Ser. No. 14/614,914, an accessory can maintain a state counter (also referred to as a "global state counter") that increments when a change in accessory state occurs. In some embodiments, the global state counter can be implemented such that it increments on an accessory state change and thereafter does not increment again until a controller (which can be any controller) connects to the accessory and reads at least some item of state information (e.g., any of the accessory's characteristics, regardless of whether the characteristic read is a characteristic that changed). An accessory can broadcast, or advertise, its global state counter value via a device discovery service on the transport(s) supported by the accessory. A controller that detects the broadcast or advertisement can read the current global state counter value and compare the current value to a stored value from the previous connection, providing a mechanism for the controller to detect a change. In the event of a change, the controller can connect to the accessory and issue additional read requests to determine what specific characteristics (or aspects of accessory state) have changed.

In some embodiments, the accessory can also maintain a per-characteristic state counter for some or all of its characteristics. The per-characteristic state counter for a given characteristic can store the value of the global state counter at the time the characteristic changes. After detecting a change in the global state counter, a controller can read per-characteristic state counters for characteristics the controller is interested in to detect any changes to these characteristics.

In some embodiments, reading of global and/or per-characteristic state counters by a controller can be facilitated via tunnel 910. For example, each accessory 904 can advertise its global state counter value using a Bluetooth LE advertisement. Tunnel 910 can receive the advertisements and update a representation of the global state counter included in the accessory database, e.g., as part of a tunnel service associated with the accessory. As described above, the tunnel service can provide various information advertised by the accessory, including, e.g., an accessory identifier that allows controllers 902 to recognize the accessory as having an established pairing, as well as the accessory's global state counter.

Controllers 902 can detect accessory state changes by communicating with tunnel 910. For example, a controller can connect to tunnel 910 and read the global state counter maintained by the tunnel service associated with a particular accessory. Based on the global state counter, the controller can determine whether accessory state has changed; if so, the controller can send additional read requests through tunnel 910 to accessory 904 to obtain the details.

As another example, a controller can register with a tunnel to be notified of global state-number change for a particular endpoint accessory. For instance, controller 902(1) can send a request message to tunnel 910 to register for (or subscribe to) notifications for accessory 904(3). Tunnel 910 can maintain information identifying the registered controllers 902 for each endpoint accessory 904. When tunnel 910 detects a change in the global state number of accessory 904(3) (e.g., based on a BLE advertisement from accessory 904(3)), tunnel 910 can generate a notification to each controller that has subscribed for notifications as to accessory 904(3), including controller 902(1). For instance, tunnel 910 can generate a notification message similar to notification messages used by accessories that support the universal accessory protocol on the transport used between controllers 902 and tunnel 910 (e.g., IP transport). This notification message can be, e.g., an unsolicited HTTP response as described in above-referenced U.S. application Ser. No. 14/614,914. Other notification techniques can also be used.

Once controller 902(1) has been notified of an accessory state change to accessory 904(3), controller 902(1) can connect to accessory 904(3) (e.g., via tunnel 910) to obtain the details, e.g., by sending read requests using the technique described above with reference to FIG. 11. In this manner, tunnel 910 can be aware that some aspect of accessory state has changed, without being privy to specific information about what characteristic(s) have changed or the current state of any characteristic. Accordingly, an interloper can obtain only limited information about accessories by extracting data from tunnel 910.

It will be appreciated that the bridge and tunnel proxies described herein are illustrative and that variations and modifications are possible. Where an accessory is visible to a controller through a bridge or tunnel, the controller can decide whether to communicate with the accessory directly or via the bridge or tunnel. For example, in the case of a bridge, all communication might be through the bridge if the controller does not support the same protocol or transport that the accessory supports. In the case of a tunnel, if the controller supports the same protocol and transport as the accessory (e.g., a uniform accessory protocol with BLE transport), the controller can apply preference rules (similar to process 600 described above) to determine whether to communicate directly with the accessory or communicate through the tunnel. In some embodiments, the preference can be to always prefer the tunnel (unless the tunnel is temporarily unavailable), as the tunnel may be positioned to optimize signal strength of the received signal at the accessory, while signal strength from the controller may be highly dependent on the (variable) position of the controller. In other embodiments, the preference may be determined using a dynamic analysis of current signal strength at the controller for signals received from the accessory, with a decision to use the tunnel or not being made based on whether the current signal strength exceeds a threshold such that reliable communication via the direct channel is expected.

A bridge or tunnel can connect any number of controllers to one or more endpoint accessories. In some embodiments, the endpoint accessory (or at least one of them) can be physically housed in the same structure as the circuitry implementing the bridge or tunnel functions, but this is not required. Further, the particular protocols and transports used herein are solely for purposes of illustration; other protocols and transports can be substituted.

In some embodiments, due to the availability of both direct and indirect communication paths, the same accessory might be visible to a controller on multiple paths at once (e.g., directly via Bluetooth LE and indirectly via a tunnel or other proxy). Where this is the case, the controller can use information provided by the accessory (e.g., an accessory identifier and/or other accessory information) to recognize when the same accessory is visible on multiple paths. The controller can then present a user interface in which a given accessory appears only once, regardless of how many communication paths to the accessory are available at a given time.

Example Coordinator Device

Embodiments described above provide proxies (including bridges and tunnels) that can relay messages between controllers and accessories. In some embodiments, an "intelligent" proxy (also referred to as a coordinator) can be used to coordinate operations among multiple controllers. Depending on implementation, a coordinator can also provide bridging and/or tunneling capabilities.

Figure 13:
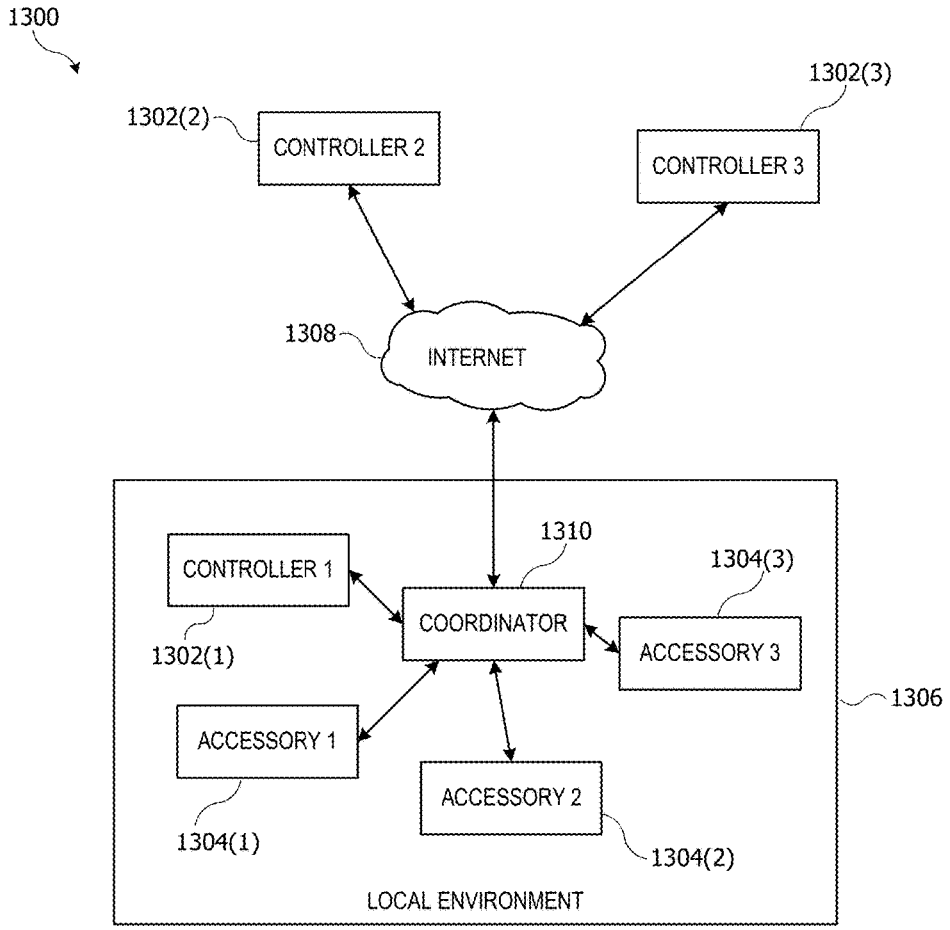
FIG. 13 shows an example of another controller network configuration according to an embodiment of the present invention.

FIG. 13 shows an example of a network configuration 1300 according to an embodiment of the present invention. Controllers 1302 and accessories 1304 can be similar or identical to controllers 502 and accessory 504 in FIG. 5, and at any given time, a controller 1302 might be present in local environment 1306 or remote, e.g., connected via wide area network 1308 (similar to wide area network 508 of FIG. 5, which can be, e.g., the Internet).

Configuration 1300 includes a coordinator 1310, which can be similar to proxy 510 (or bridge 810 or tunnel 910) in some respects. For example, controllers 1302 can communicate with accessories 1304 via coordinator 1310. Coordinator 1310 can also implement bridging, similarly to bridge 810 described above, and/or tunneling, similarly to tunnel 910, to facilitate communication between accessories 1304 and controllers 1302 that may use different transports and/or protocols.

Coordinator 1310 can be any device that is capable of presenting itself as a controller to accessory 1304 and that is capable of communicating securely with controllers 1302. In some embodiments, coordinator 1310 can be a device that is expected to stay in local environment 1306 and that is expected to be powered on and available for communication most or all the time. (It is to be understood that coordinator 1310 can occasionally be unavailable, e.g., in connection with software or firmware upgrades, power outages, or other intermittent occurrences.) For example, coordinator 1310 can be implemented in a desktop computer, a Wi-Fi or access-point unit, a dedicated accessory-control base station, a set-top box for a television or other appliance (which can implement base station functionality in addition to interacting with the television or other appliance), or any other electronic device as desired.

In network configuration 1300, controllers 1302 can be configured to communicate with accessories 1304 via coordinator 1310 whenever possible. Thus, as shown, controller 1302(1), which is in local environment 1306, communicates with coordinator 1310 rather than directly with accessories 1304, as do remotely located controllers 1302(2) and 1302 (3). Direct communication between any of controllers 1302 and accessories 1304 can be limited, e.g., to situations where coordinator 1310 is not available.

In some embodiments, coordinator 1310 can be used to coordinate access by multiple controllers 1302 to multiple accessories 1304. For example, rather than establishing a pairing between each controller 1302 and each accessory 1304, each controller 1302 can each establish a pairing with coordinator 1310, and coordinator 1310 can establish a pairing with each accessory 1304. The same pair setup and/or pair add processes used to establish a controller-accessory pairing can also be used to establish a controller-coordinator pairing, with the coordinator acting in the role of accessory. For purposes of coordinator-accessory pairing, the coordinator can assume the role of controller. Thus, coordinator 1310 can present itself as an accessory when communicating with a controller (e.g., any of controllers 1302) and as a controller when communicating with an accessory (e.g., any of accessories 1304).

Where a controller-coordinator pairing and one or more coordinator-accessory pairings are established, coordinator 1310 can present itself to controller 1302 as an "accessory network" via which controller 1302 can access all the services of all accessories 1304 with which coordinator 1310 has an established pairing. For instance, coordinator 1310 can present an accessory network modeled as a "home" or other environment. The environment model can define various physical and/or logical groupings of accessories 1304 that can be controlled in a coordinated manner. For example, an environment model can assign accessories to locations in the environment based on their physical locations. In some embodiments, the environment model can be a hierarchical representation of a physical environment (e.g., a home) that can include a lowest level of objects (e.g., rooms), with each accessory being assigned to one of the lowest-level objects (e.g., an accessory can be assigned to a room based on where it is installed or where it spends most of its time). The lowest-level objects can be grouped into higher-level objects (e.g., rooms can be grouped into zones within a home). Accessories in a network can be controlled individually or at any hierarchical level of the environment model (e.g., turning off all accessories in a particular room or zone). In addition to or instead of physically-based groupings, an environment model can also include other logical groupings of accessories such as "service groups" of accessories that are likely to be used together, and in some embodiments, accessories can be assigned to one physical grouping and any number (including zero) of logical groupings. In some embodiments, the environment model can also provide "action sets," in which a triggering event or condition (e.g., a user command or a detectable occurrence such as a time of day) can result in invoking functions of a number of accessories in the network (e.g., turning off lights and locking doors when a user goes to bed). Further examples of accessory networks and environment models are described in above-referenced U.S. Provisional Application No. 62/005,764, U.S. Provisional Application No. 62/094,391, and U.S. application Ser. No. 14/725,912. An accessory network or environment model can be as simple or complex as desired.

The accessory network can be linked to a controller network, which can be a set of controllers that have permission to access all or part of the accessory network (e.g., controllers 1302 in FIG. 13). For example, an environment model can include an access list that identifies controllers that have permission to access the accessory network. Different controllers can have different levels of permission. For instance, some controllers may have permission to edit the accessory network model and/or to add or remove other controllers to or from the access list. In some embodiments, information about the environment model can be synchronized among controllers; examples of permissions and synchronization are described in above-referenced U.S. Provisional Application No. 62/005,764, U.S. Provisional Application No. 62/094,391, and U.S. application Ser. No. 14/725,912.

Coordinator 1310 can facilitate operation of an accessory network including accessories 1304. For example, coordinator 1310 can maintain an environment model for the accessory network and can provide the model (or portions thereof) to various controllers 1302. Controllers 1302 can operate accessories 1304 by interacting with coordinator 1310.

In some embodiments, coordinator 1310 can manage permissions associated with the accessory network or environment model to limit access by specific controllers 1302 to some or all accessories 1304. In some embodiments, controllers 1302 can preferentially route all requests to accessories 1304 through coordinator 1310, and in some embodiments, accessories 1304 can be configured to communicate directly only with coordinator 1310 and to ignore requests that come directly from controllers 1302. This can allow coordinator 1310 to enforce permissions and other restrictions on access to accessories 1304.

Centralizing communication with accessories through coordinator 1310 can simplify management of a controller network and/or accessory network (e.g., controllers 1302 and accessories 1304). For example, if a new accessory is acquired, the new accessory need only establish a pairing with coordinator 1310 in order to allow all controllers 1302 to have access to the new accessory. Similarly, if a new controller 1302 is acquired, the new controller 1302 need only establish a pairing with coordinator 1310 to allow the new controller to have access to all accessories 1304. In an environment with multiple controllers (e.g., a family where the members each have multiple devices) and perhaps dozens of accessories, the time saving can be considerable.

It should be noted that in configuration 1300, it is possible that one or more of the controllers (e.g., controller 1302(1)) can be permitted to communicate with one or more accessories (e.g., accessory 1304(1)) indirectly (via coordinator 1310) but not directly, regardless of whether controller 1302(1) is in local environment 1306. This might occur, for instance, if controller 1302(1) has established a pairing with coordinator 1310 but not directly with accessory 1304(1). In some instances, this can provide enhanced security; for instance, an accessory that has a pairing established with coordinator 1310 can refuse to establish any other pairings. However, there may be cases where direct access is desirable, and establishing a direct pairing between a certain accessory, e.g., accessory 1304(1) and one or more controllers 1302 can be permitted. For example, suppose that accessory 1304(1) is a door lock and controller 1302(1) is a mobile phone. If a direct pairing between accessory 1304(1) and controller 1302(1) is established, a user can use controller 1302(1) to lock or unlock accessory 1304(1) via direct communication, thereby locking or unlocking the door. This can be useful, e.g., in the event that coordinator 1310 is temporarily unavailable. In some embodiments, coordinator 1310 can be used to indicate to accessory 1304(1) which of controllers 1302 are authorized for direct access, and accessory 1304(1) can establish pairings with authorized controllers 1302. In some embodiments, accessory 1304(1) can be configured to accept direct communication from an authorized controller 1302 only when coordinator 1310 is not available. Thus, the general rule can be that all communications with accessory 1304 go through coordinator 1310, with exceptions made on a per-accessory and per-controller basis.

Coordinator 1310 can operate as an intelligent agent for allowing controllers to operate accessories, rather than simply relaying messages as described above for proxy 510. That is, as described above, coordinator 1310 can establish a pairing with each of controllers 1302 and a pairing with each accessory 1304. When controller 1302(1), for example, receives a user request to interact with a specific accessory, e.g., accessory 1304(1), controller 1302(1) can establish a first pair-verified session with coordinator 1310 and provide its instructions for accessory 1304 to coordinator 1310 via the first pair-verified session. Coordinator 1310 can receive the instructions, establish a second pair-verified session with accessory 1304 and send appropriate control messages to accessory 1304 via the second pair-verified session. Unlike tunnel 910 described above, coordinator 1310 can be privy to the content of the instructions, and in some embodiments, the messages sent to accessory 1304 need not correspond to the instructions provided by controller 1302(1). For example, while communicating with controller 1302(1), coordinator 1310 may also be in communication with another controller (e.g., controller 1302(2)). Controllers 1302(1) and 1302(2) may each provide instructions for accessory 1304 to coordinator 1310. Coordinator 1310 can analyze the received instructions, e.g., to detect and resolve conflicts such as where controller 1302(1) instructs coordinator 1310 to turn accessory 1304 on while controller 1302(2) instructs coordinator 1310 to turn accessory 1304 off Coordinator 1310 can be programmed with priority rules or other rules for resolving conflicts (e.g., "on" takes priority over "off"; instructions from a controller with admin privilege take precedence over instructions from a controller without admin privilege; etc.). Coordinator 1310 can apply the priority rules to resolve any conflicts and can communicate instructions to accessory 1304 based on the resolution. When a response is received from accessory 1304, coordinator 1310 can determine whether to send a corresponding message (or a different message) to controller 1302(1) and/or to controller 1302(2). As another example, coordinator 1310 can enforce permissions established for various controllers 1302 and/or accessories 1304. For example, when one of controllers 1302 sends a request, coordinator 1310 can apply decision logic to determine whether the controller 1302 that sent the request has appropriate permission; if not, coordinator 1310 can reject the request. The decision logic can be as simple or complex as desired; for instance, a controller belonging to a child may be limited as to which hours of the day or for how long it can operate a particular accessory (e.g., a TV) while a parent's controller can have unlimited access, or a controller associated with a guest (e.g., a babysitter) may be restricted to operating a certain subset of the accessories. Thus, coordinator 1310 is not limited to acting as a passive relay for messages between controllers and accessories but can actively intervene to resolve conflicting instructions, enforce any limitations that may exist on the privileges or permissions granted to particular controllers or users, and so on.

Example Devices

Embodiments described herein can be implemented in electronic devices that can be of generally conventional design. Such devices can be adapted to conform to a uniform accessory protocol that supports command-and-control operations by which a controller (a first electronic device) can control operation of an accessory (a second electronic device). In some instances, a device can combine features or aspects of a controller and an accessory, e.g., in the case of a coordinator or proxy as described above.

Figure 14:
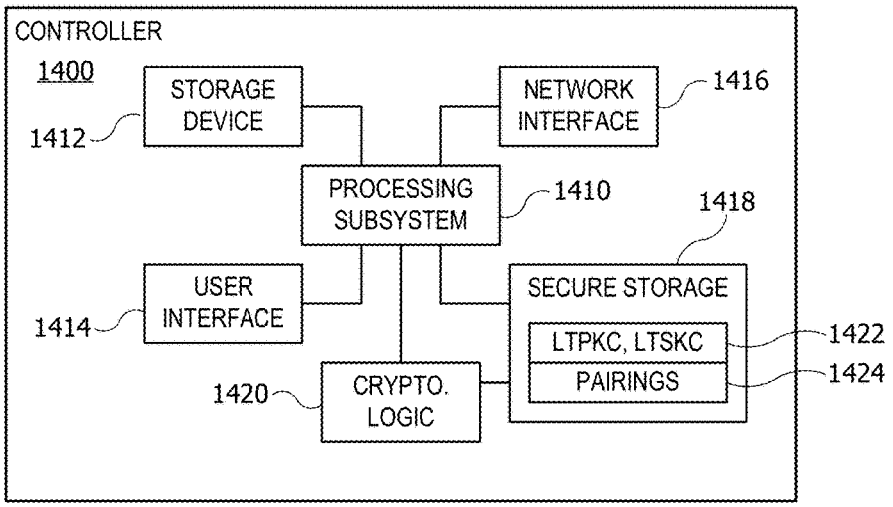
FIG. 14 is a simplified block diagram of a controller according to an embodiment of the present invention.

FIG. 14 is a simplified block diagram of a controller 1400 according to an embodiment of the present invention. Controller 1400 can implement any or all of the controller functions, behaviors, and capabilities described herein, as well as other functions, behaviors, and capabilities not expressly described. Controller 1400 can include processing subsystem 1410, storage device 1412, user interface 1414, communication interface 1416, secure storage module 1418, and cryptographic logic module 1420. Controller 1400 can also include other components (not explicitly shown) such as a battery, power controllers, and other components operable to provide various enhanced capabilities. In various embodiments, controller 1400 can be implemented in a desktop computer, laptop computer, tablet computer, smart phone, other mobile phone, wearable computing device, or other systems having any desired form factor. Further, as noted above, controller 1400 can be implemented partly in a base station and partly in a mobile unit that communicates with the base station and provides a user interface.

Storage device 1412 can be implemented, e.g., using disk, flash memory, or any other non-transitory storage medium, or a combination of media, and can include volatile and/or non-volatile media. In some embodiments, storage device 1412 can store one or more application and/or operating system programs to be executed by processing subsystem 1410, including programs to implement various operations described above as being performed by a controller. For example, storage device 1412 can store a uniform controller application that can read an accessory description record and generate a graphical user interface for controlling the accessory based on information therein (e.g., as described in above-referenced U.S. Provisional Application No. 61/935,967 and U.S. application Ser. No. 14/614,914). In some embodiments, portions (or all) of the controller functionality described herein can be implemented in operating system programs rather than applications. In some embodiments, storage device 1412 can also store apps designed for specific accessories or specific categories of accessories (e.g., an IP camera app to manage an IP camera accessory or a security app to interact with door lock accessories).

User interface 1414 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1414 to invoke the functionality of controller 1400 and can view and/or hear output from controller 1400 via output devices of user interface 1414.

Processing subsystem 1410 can be implemented as one or more integrated circuits, e.g., one or more single-core or multi-core microprocessors or microcontrollers, examples of which are known in the art. In operation, processing system 1410 can control the operation of controller 1400. In various embodiments, processing subsystem 1410 can execute a variety of programs in response to program code and can maintain multiple concurrently executing programs or processes. At any given time, some or all of the program code to be executed can be resident in processing subsystem 1410 and/or in storage media such as storage device 1412.

Through suitable programming, processing subsystem 1410 can provide various functionality for controller 1400. For example, in some embodiments, processing subsystem 1410 can implement various processes (or portions thereof) described above as being implemented by a controller. Processing subsystem 1410 can also execute other programs to control other functions of controller 1400, including application programs that may be stored in storage device 1412. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 1416 can provide voice and/or data communication capability for controller 1400. In some embodiments communication interface 1416 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1416 can provide wired network connectivity (e.g., Ethernet) in addition to or instead of a wireless interface. Communication interface 1416 can be implemented using a combination of hardware (e.g., driver circuits, antennas, modulators/demodulators, encoders/decoders, and other analog and/or digital signal processing circuits) and software components. In some embodiments, communication interface 1416 can support multiple communication channels concurrently or at different times, using the same transport or different transports.

Secure storage module 1418 can be an integrated circuit or the like that can securely store cryptographic information for controller 1400. Examples of information that can be stored within secure storage module 1418 include the controller's long-term public and secret keys 1422 (LTPKC, LTSKC as described above), and a list of paired accessories 1424 (e.g., a lookup table that maps accessory ID to accessory long-term public key LTPKA for accessories that have completed a pair setup or pair add process as described above).

In some embodiments, cryptographic operations can be implemented in a cryptographic logic module 1420 that communicates with secure storage module 1418. Physically, cryptographic logic module 1420 can be implemented in the same integrated circuit with secure storage module 1418 or a different integrated circuit (e.g., a processor in processing subsystem 1410) as desired. Cryptographic logic module 1420 can include various logic circuits (fixed or programmable as desired) that implement or support cryptographic operations of controller 1400, including any or all cryptographic operations described above. Secure storage module 1418 and/or cryptographic logic module 1420 can appear as a "black box" to the rest of controller 1400. Thus, for instance, communication interface 1416 can receive a message in encrypted form that it cannot decrypt and can simply deliver the message to processing subsystem 1410. Processing subsystem 1410 may also be unable to decrypt the message, but it can recognize the message as encrypted and deliver it to cryptographic logic module 1420. Cryptographic logic module 1420 can decrypt the message (e.g., using information extracted from secure storage module 1418) and determine what information to return to processing subsystem 1410. As a result, certain information can be available only within secure storage module 1418 and cryptographic logic module 1420. If secure storage module 1418 and cryptographic logic module 1420 are implemented on a single integrated circuit that executes code only from an internal secure repository, this can make extraction of the information extremely difficult, which can provide a high degree of security. Other implementations are also possible.

Figure 15:
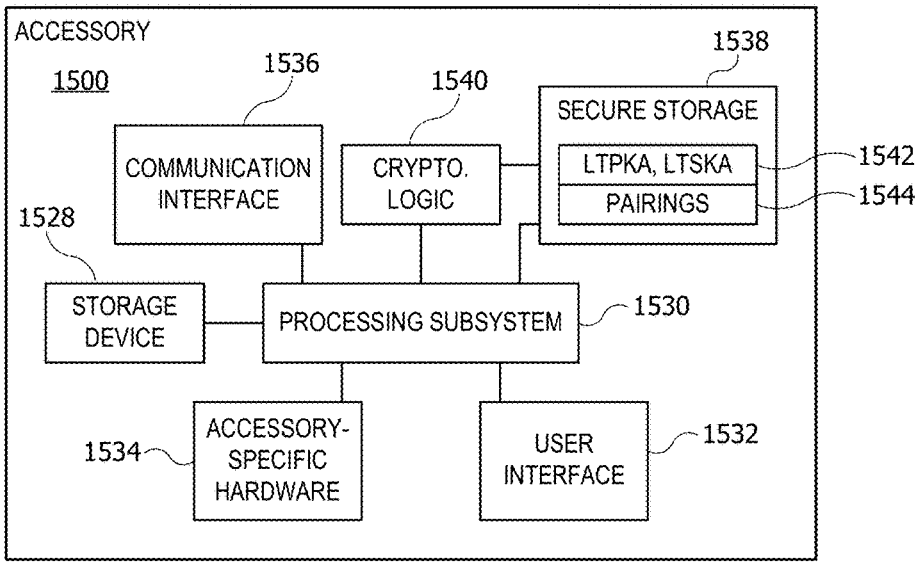
FIG. 15 is a simplified block diagram of an accessory according to an embodiment of the present invention.

FIG. 15 is a simplified block diagram of an accessory 1500 according to an embodiment of the present invention. Accessory 1500 can implement any or all of the accessory functions, behaviors, and capabilities described herein, as well as other functions, behaviors, and capabilities not expressly described. Accessory 1500 can include storage device 1528, processing subsystem 1530, user interface 1532, accessory-specific hardware 1534, communication interface 1536, secure storage module 1538, and cryptographic logic module 1540. Accessory 1500 can also include other components (not explicitly shown) such as a battery, power controllers, and other components operable to provide various enhanced capabilities.

Accessory 1500 is representative of a broad class of accessories that can be operated by a controller such as controller 1400, and such accessories can vary widely in capability, complexity, and form factor. Various accessories may include components not explicitly shown in FIG. 15, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1528 can be implemented, e.g., using disk, flash memory, or any other non-transitory storage medium, or a combination of media, and can include volatile and/or non-volatile media. In some embodiments, storage device 1528 can store one or more programs (e.g., firmware) to be executed by processing subsystem 1530, including programs to implement various operations described above as being performed by an accessory, as well as operations related to particular accessory behaviors. Storage device 1528 can also store an accessory object or accessory definition record that can be furnished to controller devices, e.g., during device discovery as described in above-referenced U.S. Provisional Application No. 61/935,967 and U.S. application Ser. No. 14/614,914. Storage device 1528 can also store accessory state information and any other data that may be used during operation of accessory 1500.

Processing subsystem 1530 can include, e.g., one or more single-core or multi-core microprocessors and/or microcontrollers executing program code to perform various functions associated with accessory 1500. For example, processing subsystem 1530 can implement various processes (or portions thereof) described above as being implemented by an accessory, e.g., by executing program code stored in storage device 1528. Processing subsystem 1530 can also execute other programs to control other functions of accessory 1530. In some instances programs executed by processing subsystem 1530 can interact with a controller (e.g., controller 1400), e.g., by generating messages to be sent to the controller and/or receiving messages from the controller.

User interface 1532 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 1500, a user can operate input devices of user interface 1532 to invoke functionality of accessory 1500 and can view and/or hear output from accessory 1500 via output devices of user interface 1532. Some accessories may provide a minimal user interface or no user interface at all. Where the accessory does not have a user interface, a user can still interact with the accessory using a controller (e.g., controller 1400).

Accessory-specific hardware 1534 can include any other components that may be present in accessory 1500 to enable its functionality. For example, in various embodiments accessory-specific hardware 1534 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 1534 and that accessory-specific hardware can include mechanical as well as electrical or electronic components.

Communication interface 1536 can provide voice and/or data communication capability for accessory 1500. In some embodiments communication interface 1536 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1536 can provide wired network connectivity (e.g., Ethernet) in addition to or instead of a wireless interface. Communication interface 1536 can be implemented using a combination of hardware (e.g., driver circuits, antennas, modulators/demodulators, encoders/decoders, and other analog and/or digital signal processing circuits) and software components. In some embodiments, communication interface 1536 can support multiple communication channels concurrently or at different times, using the same transport or different transports.

Secure storage module 1538 can be an integrated circuit or the like that can securely store cryptographic information for accessory 1500. Examples of information that can be stored within secure storage module 1538 include the accessory's long-term public and secret keys 1542 (LTPKA, LTSKA as described above), and a list of paired controllers 1544 (e.g., a lookup table that maps controller ID to controller long-term public key LTPKC for controllers that have completed a pair setup or pair add process as described above). In some embodiments, secure storage module 1538 can be omitted; keys and lists of paired controllers can be stored in storage device 1528.

In some embodiments, cryptographic operations can be implemented in a cryptographic logic module 1540 that communicates with secure storage module 1538. Physically, cryptographic logic module 1540 can be implemented in the same integrated circuit with secure storage module 1538 or a different integrated circuit (e.g., a processor in processing subsystem 1530) as desired. Cryptographic logic module 1540 can include various logic circuits (fixed or programmable as desired) that implement or support cryptographic operations of accessory 1500, including any or all cryptographic operations described above. Secure storage module 1538 and/or cryptographic logic module 1540 can appear as a "black box" to the rest of accessory 1500. Thus, for instance, communication interface 1536 can receive a message in encrypted form that it cannot decrypt and can simply deliver the message to processing subsystem 1530. Processing subsystem 1530 may also be unable to decrypt the message, but it can recognize the message as encrypted and deliver it to cryptographic logic module 1540. Cryptographic logic module 1540 can decrypt the message (e.g., using information extracted from secure storage module 1538) and determine what information to return to processing subsystem 1530. As a result, certain information can be available only within secure storage module 1538 and cryptographic logic module 1540. If secure storage module 1538 and cryptographic logic module 1540 are implemented on a single integrated circuit that executes code only from an internal secure repository, this can make extraction of the information extremely difficult, which can provide a high degree of security. Other implementations are also possible.

Accessory 1500 can be any electronic apparatus that interacts with controller 1400. In some embodiments, controller 1400 can provide remote control over operations of accessory 1500 as described above. For example controller 1400 can provide a remote user interface for accessory 1500 that can include both input and output controls (e.g., a display screen to display current status information obtained from accessory 1500 and an input control such as a touch-screen overlay to allow changes to the status information). Controller 1400 in various embodiments can control any function of accessory 1500 and can also receive data from accessory 1500.

It will be appreciated that the system configurations and components described herein are illustrative and that variations and modifications are possible. It is to be understood that an implementation of controller 1400 can perform any or all of the operations described above as any performed by a controller and that an implementation of accessory 1500 can perform any or all of the operations described above as being performed by an accessory. A proxy, bridge, tunnel, or coordinator can combine components of controller 1400 and accessory 1500, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further Embodiments

While the invention has been described with respect to specific embodiments, one skilled in the art will recognize that numerous modifications are possible. Controller networks and/or accessory networks can include as many or as few devices as desired. Use of a proxy (including a bridge or tunnel proxy) or coordinator is not required; regardless of the number of accessories or number of controllers, it is always possible (at least in principle) to establish pairings between each controller and each accessory and to have all controllers operate by controlling accessories directly. Where an accessory-network model is provided, each controller can obtain a copy of the model and use the model to facilitate user control of the accessories, e.g., by rendering a user interface based at least in part on information contained in the model.

Further, where proxies (including bridges and/or tunnels) or coordinators are present, it can be but need not be the case that all controllers are permitted to access all accessories via the proxy or coordinator. Some controllers might be restricted from accessing accessories when not within the local environment, and some accessories might require that controllers access them directly rather than through a proxy or coordinator.

In some embodiments, a model of an accessory or accessory network can include an identification of one or more controller devices as being preferred (or permitted) proxies or coordinators. In some instances, multiple coordinators and/or proxies can be designated within an accessory-network model. Where the accessory-network model includes identification of proxies or coordinators, this can facilitate selection of a proxy or coordinator by another controller (e.g., during the process shown in FIG. 6).

It should also be understood that the use of a coordinator can but need not eliminate the need for controllers to establishing pairings with accessories. For example, in some embodiments described above, all communication with accessories can be mediated by a coordinator. Where this is the case, other controllers can be required to pair with the coordinator but not with individual accessories. In some embodiments, controllers can be required to pair with the coordinator as a precondition of being allowed to communicate with accessories on an accessory network. For example, the controller can perform pair setup to pair with a coordinator, and the coordinator can thereafter perform pair add to add the controller as an authorized controller for various accessories.

Further, some embodiments can manage security on a per-user basis rather than a per-controller basis. For example, in embodiments described above, each controller can have its own long-term public key and long-term secret key, independent of any other controller. In other embodiments, a long-term public/secret key pair can be assigned to a user (rather than to a specific controller) and shared among all controllers belonging to the user. For instance, a long-term public/secret key pair can be associated with the user's account on a cloud-based data service and propagated to devices that the user links to the account. Appropriate measures can be implemented to securely propagate the key pair. Where long-term keys are managed per-user rather than per-controller, an accessory (or coordinator) can establish a pairing with a user rather than a controller; thereafter, the accessory can accept messages from any controller device that presents the user's identifier and sufficient proof that it has the user's long-term secret key.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

[1. A method executable by a controller device, the method comprising:

receiving, at the controller device, a user input requesting an interaction with an accessory device, wherein the interaction identifies an operation corresponding to the accessory device to be performed;

identifying a proxy device that is configured to communicate with the accessory device, wherein the controller device has previously established a pairing with the proxy device;

establishing communication with the proxy device, wherein establishing communication with the proxy device includes establishing a pair-verified session with the proxy device based on the previously established pairing, the pair-verified session having a first session key;

generating a request message to the accessory to perform the operation, wherein the request message includes a data item encrypted with a second session key that is not shared by the proxy device, and wherein an instruction message for the accessory device includes the data item; and communicating, via the pair-verified session, the request message to the proxy device to instruct the accessory device to perform the operation, wherein the request message is configured to be relayed to the accessory device by the proxy device.]

[2. The method of claim 1 wherein identifying the proxy device includes:

obtaining a list of potential proxy devices; and selecting the proxy device from the list according to a selection rule.]

[3. The method of claim 2 wherein obtaining the list of potential proxy devices includes:

during a pair-verified session with the accessory device that occurs prior to receiving the user input, obtaining from the accessory device a list of paired controller devices; and subsequently using the list of paired controller devices as the list of potential proxy devices.]

[4. The method of claim 2 wherein obtaining the list of potential proxy devices includes accessing a list of paired controller devices for the accessory that is maintained at a cloud-based data service.]

[5. The method of claim 2 wherein each potential proxy device is assigned a device type of a plurality of device types, and wherein the selection rule is based at least in part on a hierarchy of the plurality of device types.]

[6. The method of claim 2 wherein selecting the proxy device includes:

selecting a first proxy device from the list; and in the event that the first proxy device is not available, selecting a different proxy device from the list.]

[7. The method of claim 1 wherein identifying the proxy device includes communicating with a cloud-based data service to identify a preferred proxy device from a list of devices having access to the accessory.]

[8. The method of claim 1, further comprising presenting, at the controller device, a user interface that identifies a plurality of accessory operations corresponding to an accessory device, wherein the operation of the requested interaction is one of the plurality of accessory operations.]

[9. A method executable by a proxy device configured to communicate with an accessory device, the method comprising:

establishing a pairing with a controller device;

thereafter establishing a pair-verified session with the controller device based on the previously established pairing with the controller device, the pair-verified session having a first session key;

receiving, via the pair-verified session with the controller device, a request message indicating an operation of the accessory device to be performed by the accessory device, wherein the request message received from the controller device includes a data item encrypted with a second session key that is not shared by the proxy device, and wherein an instruction message for the accessory device includes the data item;

sending the instruction message to the accessory device to perform the operation based on the received request message; and sending to the controller device, via the pair-verified session with the controller device, a response message responsive to the received request message.]

[10. The method of claim 9 further comprising:

receiving an instruction-response message from the accessory device responsive to the instruction message, wherein the response message sent to the controller device is based on the instruction-response message received from the accessory device.]

[11. The method of claim 9 further comprising:

interpreting the received request message to determine the operation to be performed; and generating the instruction message to the accessory device based on the interpreting.]

[12. The method of claim 11 wherein interpreting the received request message includes determining that the controller device has permission to perform the accessory action.]

[13. The method of claim 11 wherein interpreting the received request message includes resolving a conflict among a plurality of received request messages from a plurality of controller devices.]

[14. The method of claim 9 wherein the request message received from the controller device conforms to a first protocol for communicating with accessories and the proxy device translates the received request message to an instruction message conforming to a second protocol for communicating with accessories.]

[15. The method of claim 14 further comprising, prior to receiving the request message from the controller device:

obtaining accessory information from the accessory device, the accessory information including a first set of identifiers of accessory characteristics conforming to the second communication protocol; and constructing a mapping of the set of identifiers of the accessory characteristics to a second set of identifiers conforming to the first communication protocol, wherein translating the received request message includes using the mapping to translate the request message from the second communication protocol to the first communication protocol.]

[16. The method of claim 9 wherein the data item represents a value to be written to an accessory characteristic of the accessory device, wherein writing the value to the accessory characteristic results in changing an aspect of a state of the accessory device.]

[17. The method of claim 9 wherein establishing the pairing with the controller device occurs while the controller device is present in a local environment with the proxy device and receiving the request message from the controller device occurs while the controller device is absent from the local environment.]

[18. A method executable by a controller device, the method comprising:

establishing a first pairing with an accessory device;

establishing a second pairing with a proxy device;

receiving, at the controller device, a user input requesting an operation corresponding to the accessory device to be performed; and in response to the user input:

establishing, based on the second pairing, a first pair-verified session with the proxy device, the first pair-verified session having a first session key that is shared by the controller device and the proxy device but not by the accessory device;

communicating, via the first pair-verified session, with the accessory device to establish a second pair-verified session with the accessory device, the second pair-verified session having a second session key that is shared by the controller device and the accessory device but not by the proxy device;

generating a request message to the proxy device to be relayed to the accessory based on the requested operation, wherein generating the request message includes encrypting at least a portion of the request message using the second session key;

encrypting the request message using the first session key;

sending the request message to the proxy device;

receiving a response message from the proxy device;

decrypting the response message using the first session key;

extracting, from the decrypted response message, an included item from the accessory device; and decrypting the included item using the second session key.]

[19. The method of claim 18 wherein the accessory device and the proxy device are both located in a local environment and wherein establishing the first pairing and establishing the second pairing are performed at a time when the controller device is present in the local environment.]

[20. The method of claim 19 wherein establishing the first pair-verified session and establishing the second pair-verified session are performed at a time when the controller device is absent from the local environment.]

[21. A controller device comprising:

a communication interface to communicate with one or more other devices including one or both of an accessory device or a proxy device;

a user interface to receive input from a user; and a processing subsystem coupled to the communication interface and the user interface and configured to:

receive, via the user interface, a user input requesting an interaction with an accessory device, wherein the interaction identifies an operation corresponding to the accessory device to be performed;

identify a proxy device that is configured to communicate with the accessory device, wherein the controller device has previously established a pairing with the proxy device;

establish communication with the proxy device, wherein establishing communication with the proxy device includes establishing a pair-verified session with the proxy device based on the previously established pairing, the pair-verified session having a session key;

generate a request message to the accessory to perform the operation, wherein the request message includes a data item encrypted with a second session key that is not shared by the proxy device, and wherein an instruction message for the accessory device includes the data item; and communicate, within the pair-verified session, an instruction to the proxy device to instruct the accessory device to perform the operation.]

[22. A proxy device comprising:

a communication interface to communicate with one or more other devices including one or both of a controller device or an accessory device; and a processing subsystem coupled to the communication interface and configured to:

establish a pairing with a controller device;

establish a pair-verified session with the controller device based on the previously established pairing with the controller device, the pair-verified session having a first session key;

receive, via the pair-verified session with the controller device, a request message indicating an operation of the accessory device to be performed by the accessory device, wherein the request message received from the controller device includes a data item encrypted with a second session key that is not shared by the proxy device, and wherein an instruction message for the accessory device includes the data item;

send the instruction message to the accessory device based on the received request message; and send to the controller device, via the pair-verified session with the controller device, a response message responsive to the received request message.]

*23. A method, comprising:*

*detecting, by a first device, an advertisement to connect to a second device;*

*establishing, by the first device, a connection with the second device according to a first protocol, wherein the first protocol is specific to the second device;*

*performing, by the first device, a read of an accessory database stored on the first device to identify at least one functionality of the second device;*

*transmitting, by the first device, a notification to a third device according to a second protocol, the notification comprising information that identifies the first device, wherein the second protocol is different from the first protocol;*

*establishing, by the first device, a pairing of the first device and the third device using the second protocol;*

*receiving, from the third device, a first request for information about an attribute of the second device obtainable from the accessory database of the first device;*

*receiving, from the third device, a second request, according to the second protocol, to read from or write to a memory location corresponding to a characteristic associated with the functionality of the second device;*

*establishing, based at least in part on the second request, a communication session with the second device according to the first protocol;*

*translating, by the first device, the second request from the second protocol to the first protocol; and*

*relaying, by the first device, at least the translated second request from the third device to the second device during the communication session.*

*24. The method of claim 23, wherein the communication session with the second device is established by: receiving, from the second device, a public key of the second device; and generating a session key for the communication session based at least in part on the public key of the second device.*

*25. The method of claim 24, wherein the messages are encrypted using the session key.*

*26. The method of claim 23, further comprising: storing a representation of the accessory database.*

*27. The method of claim 26, further comprising:*

*transmitting the representation of the accessory database to the third device in response to the first request.*

*28. The method of claim 23, wherein the communication session with the second device is established based at least in part on a Bluetooth protocol.*

*29. The method of claim 23, wherein the accessory database comprises an identifier of a state of the second device.*

*30. The method of claim 23, wherein the first protocol comprises a Bluetooth protocol and the second protocol comprises an Internet Protocol (IP) protocol.*

*31. The method of claim 23, wherein the second device comprises an accessory device connected via a Bluetooth protocol.*

*32. The method of claim 23, wherein the third device comprises a controller device capable of controlling the second device, and wherein the third device is connected via an Internet Protocol (IP) or a WiFi protocol.*

*33. A first device, comprising: a memory configured to store computer-executable instructions; and one or more processors in communication with the memory and configured to execute the computer-executable instructions to: detect an advertisement to connect to a second device; establish a connection with the second device according to a first protocol, wherein the first protocol is specific to the second device; perform a read of an accessory database stored on the first device to identify at least one functionality of the second device; transmit, a notification to a third device according to a second protocol, the notification comprising information that identifies the first device, wherein the second protocol is different from the first protocol; establish a pairing with the third device; receive, from the third device, a first request for information about an attribute of the second device obtainable from the accessory database of the first device; receive, from the third device, a second request to read from or write to a memory location corresponding to a characteristic associated with the functionality of the second device; establish, based at least in part on the second request, a communication session with the second device according to the first protocol; translate the second request from the second protocol to the first protocol; and during the communication session, relaying, by the first device, at least the translated second request from the third device to the second device.*

*34. The first device of claim 33, wherein the communication session with the second device is established by: receiving, from the second device, a public key of the second device; and generating a session key for the communication session based at least in part on the public key of the second device.*

*35. The first device of claim 34, wherein the messages are encrypted using the session key.*

*36. The first device of claim 33, the one or more programs further including instructions for: storing a representation of the accessory database.*

*37. The first device of claim 36, the one or more programs further including instructions for: transmitting the representation of the accessory database to the third device in response to the first request.*

*38. The first device of claim 33, wherein the communication session with the second device is established based at least in part on a Bluetooth protocol.*

*39. The first device of claim 33, wherein the accessory database comprises an identifier of a state of the second device.*

*40. The first device of claim 33, wherein the first protocol comprises a Bluetooth protocol and the second protocol comprises an Internet Protocol (IP) protocol.*

*41. The first device of claim 33, wherein the second device comprises an accessory device connected via a Bluetooth protocol.*

*42. The first device of claim 33, wherein the third device comprises a controller device capable of controlling the second device, and wherein the third device is connected via an Internet Protocol (IP) or a WiFi protocol.*

*43. A non-transitory computer-readable storage medium storing computer-executable instructions that, when executed by a one or more processors of a first device, configure the one or more processors to perform operations comprising:*

*detecting an advertisement to connect to a second device;*

*establishing a connection with the second device according to a first protocol, wherein the first protocol is specific to the second device;*

*performing a read of an accessory database stored on the first device to identify at least one functionality of the second device;*

*transmitting, a notification to a third device according to a second protocol, the notification comprising information that identifies the first device, wherein the second protocol is different from the first protocol;*

*establishing, a pairing with the third device using the second protocol;*

*receiving, from the third device, a first request for information about an attribute of the second device obtainable from the accessory database of the first device; receiving, from the third device, a second request to*

*read from or write to a memory location corresponding to a characteristic associated with the functionality of the second device;*

*establishing, based at least in part on the second request, a communication session with the second device according to the first protocol;*

*translating the second request from the second protocol to the first protocol; and*

*relaying at least the translated second request from the third device to the second device during the communication session.*

*44. The non-transitory computer-readable storage medium of claim 43, wherein the communication session with the second device is established by:*

*receiving, from the second device, a public key of the second device; and*

*generating a session key for the communication session based at least in part on the public key of the second device.*

*45. The non-transitory computer-readable storage medium of claim 44, wherein the messages are encrypted using the session key.*

*46. The non-transitory computer-readable storage medium of claim 43, wherein the first protocol comprises a Bluetooth protocol and the second protocol comprises an Internet Protocol (IP) protocol.*

*47. The non-transitory computer-readable storage medium of claim 43, the computer-executable instructions further including instructions for: storing a representation of the accessory database.*

*48. The non-transitory computer-readable storage medium of claim 47, the computer-executable instructions further including instructions for: transmitting the representation of the accessory database to the third device in response to the first request.*

*49. The non-transitory computer-readable storage medium of claim 43, wherein the communication session with the second device is established based at least in part on a Bluetooth protocol.*

*50. The non-transitory computer-readable storage medium of claim 43, wherein the accessory database comprises an identifier of a state of the second device.*

*51. The non-transitory computer-readable storage medium of claim 43, wherein the second device comprises an accessory device connected via a Bluetooth protocol.*

*52. The non-transitory computer-readable storage medium of claim 43, wherein the third device comprises a controller device capable of controlling the second device, and wherein the third device is connected via an Internet Protocol (IP) or a WiFi protocol.*

* * * * *